(12) United States Patent
Ritchie et al.

(10) Patent No.: US 11,666,972 B2
(45) Date of Patent: Jun. 6, 2023

(54) USE OF 3D PRINTING FOR ANTICOUNTERFEITING

(71) Applicant: Verrana, LLC, Silver Spring, MD (US)

(72) Inventors: Gary Ritchie, Thurmont, MD (US); Rebecca Maksimovic, Washington, DC (US); Sharon Flank, Washington, DC (US); William Flank, Chappaqua, NY (US)

(73) Assignee: VERRANA, LLC, Silver Spring, MD (US)

( * ) Notice: Subject to any disclaimer, the term of this patent is extended or adjusted under 35 U.S.C. 154(b) by 347 days.

(21) Appl. No.: 16/915,906

(22) Filed: Jun. 29, 2020

(65) Prior Publication Data

US 2020/0398549 A1    Dec. 24, 2020

Related U.S. Application Data

(63) Continuation of application No. 15/108,274, filed as application No. PCT/US2015/012866 on Jan. 26, 2015, now abandoned.

(Continued)

(51) Int. Cl.
*B33Y 10/00* (2015.01)
*B33Y 80/00* (2015.01)
(Continued)

(52) U.S. Cl.
CPC .............. *B22F 10/14* (2021.01); *B22F 10/12* (2021.01); *B22F 10/39* (2021.01); *B22F 10/80* (2021.01);
(Continued)

(58) Field of Classification Search
CPC ...... B22F 10/10; B29C 64/112; B29C 64/118; B29C 64/336
See application file for complete search history.

(56) References Cited

U.S. PATENT DOCUMENTS 4,917,927 A   4/1990  Sakaitani et al.
6,875,301 B2  4/2005  Kauppi et al.
(Continued)

FOREIGN PATENT DOCUMENTS

EP    2 846 304 A1    3/2015
WO    2012146943 A2   11/2012

OTHER PUBLICATIONS

Written Opinion of the International Searching Authority for PCT/US2015/012866, dated May 13, 2015.
(Continued)

*Primary Examiner* — Nahida Sultana
(74) *Attorney, Agent, or Firm* — Oppedahl Patent Law Firm LLC

(57) ABSTRACT

The invention pertains to the use of sophisticated chemical formulation and spectroscopic design methods to select taggants compatible with the 3D print medium that are easily detected spectroscopically but otherwise compatible with the product, structural integrity and stability, and aesthetics. A spectral pattern employs a different chemical or combination of chemicals to alter the formulation of all or some portion of the printed object so that its authenticity can be monitored later using a spectrometer.

12 Claims, 30 Drawing Sheets

Related U.S. Application Data

(60) Provisional application No. 61/931,035, filed on Jan. 24, 2014.

(51) Int. Cl.

| | | |
|---|---|---|
| *B29C 64/112* | (2017.01) | |
| *B29C 64/336* | (2017.01) | |
| *B29C 64/118* | (2017.01) | |
| *B22F 10/12* | (2021.01) | |
| *B22F 10/14* | (2021.01) | |
| *B22F 10/39* | (2021.01) | |
| *B22F 10/80* | (2021.01) | |
| *B33Y 30/00* | (2015.01) | |
| *B33Y 50/02* | (2015.01) | |
| *B29K 23/00* | (2006.01) | |
| *B29K 33/04* | (2006.01) | |
| *B29K 55/02* | (2006.01) | |
| *B29K 67/00* | (2006.01) | |
| *B29K 69/00* | (2006.01) | |
| *B29K 105/16* | (2006.01) | |
| *B29K 509/00* | (2006.01) | |
| *G01N 21/33* | (2006.01) | |
| *G01N 21/35* | (2014.01) | |
| *G01N 21/64* | (2006.01) | |
| *G01N 21/65* | (2006.01) | |
| *G01N 23/223* | (2006.01) | |

(52) U.S. Cl.
CPC ......... *B29C 64/112* (2017.08); *B29C 64/118* (2017.08); *B29C 64/336* (2017.08); *B33Y 30/00* (2014.12); *B33Y 50/02* (2014.12); *B33Y 80/00* (2014.12); *B29K 2023/065* (2013.01); *B29K 2033/04* (2013.01); *B29K 2055/02* (2013.01); *B29K 2067/003* (2013.01); *B29K 2069/00* (2013.01); *B29K 2105/16* (2013.01); *B29K 2509/00* (2013.01); *B29K 2995/0035* (2013.01); *B33Y 10/00* (2014.12); *G01N 21/33* (2013.01); *G01N 21/35* (2013.01); *G01N 21/6428* (2013.01); *G01N 21/65* (2013.01); *G01N 23/223* (2013.01)

(56) References Cited

U.S. PATENT DOCUMENTS

| | | | |
|---|---|---|---|
| 8,934,994 B1 | 1/2015 | Lee | |
| 10,549,487 B1* | 2/2020 | Strand | G05B 19/408 |
| 2009/0141961 A1 | 6/2009 | Smith et al. | |
| 2010/0140550 A1* | 6/2010 | Keller | C09K 11/77 |
| | | | 252/301.4 R |
| 2013/0300101 A1 | 11/2013 | Wicker et al. | |
| 2014/0042670 A1* | 2/2014 | Pettis | B29C 64/393 |
| | | | 264/401 |
| 2014/0156053 A1* | 6/2014 | Mahdavi | H04L 9/3271 |
| | | | 700/119 |
| 2015/0273757 A1 | 10/2015 | Pforte et al. | |
| 2017/0305067 A1* | 10/2017 | Cortes | B29C 64/153 |
| 2018/0356405 A1* | 12/2018 | Chou | G01N 33/5302 |
| 2019/0309264 A1* | 10/2019 | Presnell | C12N 5/0653 |
| 2022/0111116 A1* | 4/2022 | Dewey | B29C 64/209 |

OTHER PUBLICATIONS

International Search Report for PCT/US2015/012866, dated May 13, 2015.

Supplementary Partial European Search Report in EP 15740707, completed Jul. 21, 2017.

Supplementary European Search Report in EP 15740707, completed Nov. 3, 2017.

"What is ink"(http://www.pressproof.com/Graphics_Library/printcncpts/printcncpts_n.html, cited via Internet Wayback Machine, Jan. 25, 2012; https://web.archive.org/web/20120125032219/http://www.pressproof.com/Graphics_Library/printcncpts/printcncpts_n.html); 4 pages(Year:2012).

\* cited by examiner

USE OF 3D PRINTING FOR ANTICOUNTERFEITING

BACKGROUND

The present invention relates generally to the field of identifying genuine product when created by 3D printing, through the use of chemical taggants or additives, in quantities ranging from fractional parts per million to 10% of the total sample, as well as controlled media formulation variations. The chemical taggants or formula variations act as a fingerprint, which can be detected using a chemical analyzer, e.g., a spectrometer, in one or more regions of the electromagnetic spectrum (including ultraviolet, visible, near-infra red, mid-infra red, x-ray fluorescence).

3D printing is increasingly acknowledged as vulnerable to counterfeiting. (http://www.scientificamerican.com/article/3-d-printinfi-will-be-a-counterfeiters-best-friend/). There are two basic paths to creating counterfeits with 3D printing. An existing object (including a genuine branded or licensed product) can be 3D-scanned to create the instructions, or blueprint, for printing a copy. Alternatively, the instructions, or blueprint, can be created as software, and then shared. Hybrids of the two paths also exist, e.g., a 3D scan version that is then altered to change one or more characteristics.

Simply requiring that the blueprint file contain an authorization code (Jung, et al., U.S. Pat. No. 8,286,236) is not enough to prevent all types of 3D counterfeiting. The authorization code validates the printing process, but leaves no trace of that validation (or the lack of it) on the product that is generated. Apple's application 20130341400 (Simon Larocque-Lancaster) addresses a physical 3D mark, but again, this is minimal protection, in this case because it assumes the ability to tuck away a visible mark unobtrusively.

Using authorized material alone is also insufficient, in the same way that it is possible to use genuine Hewlett Packard ink in a genuine Hewlett Packard printer . . . to make illegal copies of a copyrighted work, or to print a plagiarized document. Encoding the instructions for materials tagging into the blueprint makes it possible to use software controls (authorized secure downloads) to limit proliferation of physical copies.

Limiting unauthorized versions is important to brand owners and important for public safety. Brand owners want away to ensure that the products in the marketplace are genuine, both to ensure quality and to ensure that they are getting paid for their work. They see 3D printing as an opportunity and a threat. It constitutes an opportunity to offer personalized, custom versions of a wide range of products, from shoes to jewelry, spare parts to medical implants. However, it also threatens their brand, their quality, and their market: how can they distinguish a branded athletic shoe from a knockoff, or a customized medical implant from a dangerous chunk of plastic, if both are 3D printed? Brand owners currently spend millions on ensuring that their products in the marketplace are genuine, employing quality inspectors, secret shoppers, security teams and forensic laboratories, many incorporating spectroscopic and other chemical analysis tools. These teams check distributors, monitor suspect products at customs in cooperation with border authorities, and visit retailers to keep tabs on their supply chain. When knockoffs slip through, the brand owners are alerted when suspect product is returned, often because it failed, and their labs spend time and money searching for the cause of failure, or attempting to prove that the failed product is in fact a fake. Authentication is the fastest-growing segment of the broader anti-counterfeiting market, because faster—and more portable—ways to check on products save money, time and reputation.

The existing anti-counterfeiting effort is, however, insufficient to meet the challenges of 3D printing, thus inspiring the current invention.

Different 3D printing media have different curing methods, but all are amenable to chemical fingerprinting.

Methods for 3D printing include:

fused deposition modeling (FDM), the technology that squirts the melted plastic out the head of the 3D printer, on which a major patent expired in 2009 (U.S. Pat. No. 5,121,329 A). The heat-tolerance requirements for a taggant in this case are in the range of 250 C, which somewhat restricts the universe of available taggants, but still allows multiple cost-effective, safe choices.

selective laser sintering (SLS)—a high-quality 3D-printing technology that can use metal, glass and ceramic materials as media, cured by lasers, based on a now-expired series of patents filed by Carl Deckard in the 1990s (U.S. Pat. No. 5,597,589 A)

stereolithographic (or SLA) 3D printing techniques—which put down a thin layer of resin that is cured with a UV laser (U.S. Pat. No. 4,575,330 A), either cured, layer by layer, as each layer is exposed to the UV curing as it moves up on a platform in a vat of liquid photopolymer, or deposited (as in a spray) in layers.

Some methods melt or soften material to produce the layers, e.g., selective laser melting (SLM), e.g. of aluminum mixtures, or direct metal laser sintering (DMLS).

With laminated object manufacturing (LOM), thin layers are cut to shape and joined together (e.g., paper, polymer, metal).

3D printing here is to be understood to include all types of sequential-layer material addition/joining throughout a 3D work envelope under automated control. Related technologies, also to be included, are desktop manufacturing, rapid manufacturing, and on-demand manufacturing.

The term 3D printing originally referred to a process employing standard and custom inkjet print heads. The most prevalent 3D technology—especially hobbyist and consumer-oriented models—is fused deposition modeling, a special application of plastic extrusion.

Additive Manufacturing (AM) processes for metal sintering or melting (such as selective laser sintering, direct metal laser sintering, and selective laser melting) are included.

Applications for AM technologies that may need to identify genuine product include architecture, construction, industrial design, automotive, aerospace, military, engineering, dental and medical industries, biotech (implantables and human tissue replacement), fashion, footwear, jewelry, eyewear, food, and spare parts.

3D scanning is a process of analyzing and collecting digital data on the shape and appearance of a real object. Based on this data, three-dimensional models of the scanned object can then be produced.

Models or blueprints are available on 3D printing marketplaces on the Internet such as Shapeways, Thingiverse, MyMiniFactory and Threeding.

SUMMARY

The current invention makes it possible to create a specially-marked genuine or authorized version of an item, print it with a 3D printer, then validate it in the field with a spectrometer or similar chemical analysis device.

This represents a significant improvement over existing methods because it is rapid, convenient, inexpensive, and aligns well with the 3D design and printing process, while overcoming the problem of rogue copying inherent in the rise of 3D printing. Tagging can be covert, in particular because spectroscopic (rather than visual) detection makes it possible for the taggant layer to be below the surface of the finished 3D-printed object. This under-the-skin tagging represents a substantial advance in security.

To describe this in a different way, a manufacturing method creates an object, using additive manufacturing for two materials that look, to the human eye, to be the same color, but that differ when tested with a spectrometer. In other words, an object is manufactured and contains portions of two materials that look, to the human eye, to be the same color, but that differ when tested with a spectrometer.

The tagging in layers also represents a considerable advance over simply mixing a taggant chemical into a single printing medium, since it makes possible a much larger number of tag options (e.g. in the top left corner, layered 1-2-3, or 1-3-2, or 2-3-1, or 2-double-thickness-3-1, or in the bottom right corner, and so on).

To describe this in a different way, an object is created using additive manufacturing, with one material creating an initial shape, and a patch of a different, spectroscopically-detectable material layered on so that it can be detected by a spectrometer, and then covered with a third material so that the patch, though covered, is still spectroscopically detectable. In other words, an additive manufacturing method creates an object, with one material creating an initial shape, and a patch of a different, spectroscopically-detectable material is layered on so that it can be detected by a spectrometer, and then covered with a third material so that the patch, though covered, is still spectroscopically detectable.

The field of the invention pertains to brand protection and anti-counterfeiting. More specifically, the invention pertains to the use of sophisticated chemical formulation and spectroscopic design methods to select taggants compatible with the 3D print medium that are easily detected spectroscopically but otherwise compatible with the product, structural integrity and stability of the product, and aesthetics. Even more specifically, the invention pertains to the use of a spectral pattern employing a different chemical or combination of chemicals to alter the formulation of all or some portion of the printed object so that its authenticity can be monitored later using a spectrometer.

The invention includes taggant or taggants, including those that are mixed in or layered within or onto the printed object. The invention also includes controlled variations in the formulation of the multi-component media.

BRIEF DESCRIPTION OF THE DRAWINGS

The invention is described with respect to a drawing in several figures. Where possible, like elements among the figures are denoted with like reference numerals.

DETAILED DESCRIPTION OF THE DRAWINGS

Figure 1:
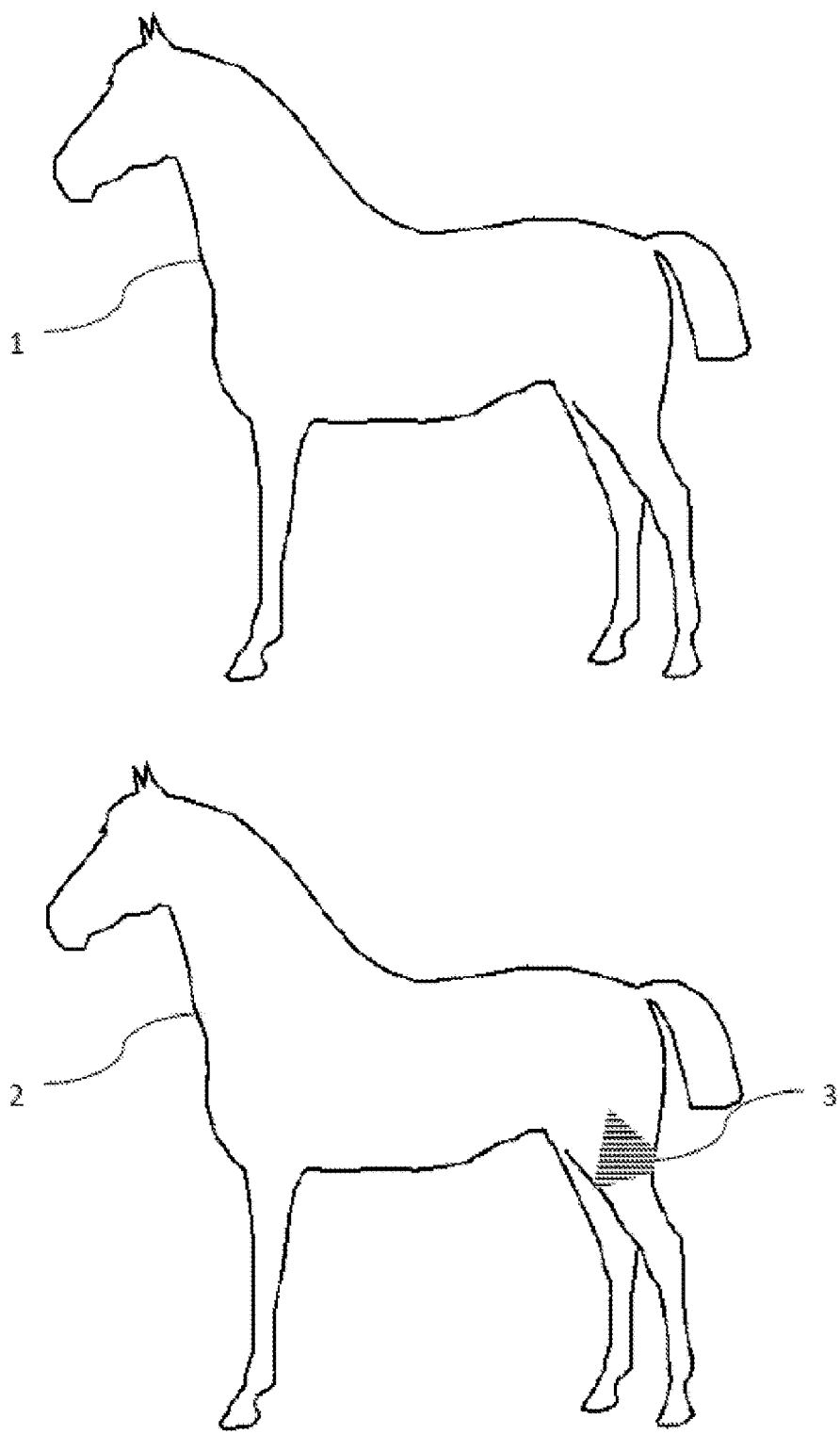
FIG. 1 is a diagram illustrating an authorized 3D-printed object containing one or more layers of taggant or differential media, implemented in a sub-surface layer on a particular spot on the product, and a visually similar unauthorized 3D-printed object containing no taggant, according to an embodiment of the disclosure.

FIG. 1 is a diagram illustrating an authorized 3D-printed object 2 containing one or more layers of taggant 3 or differential media, implemented in a sub-surface layer on a particular spot on the product, and a visually similar unauthorized 3D-printed object 1 containing no taggant, according to an embodiment of the disclosure.

To describe this in a different way, an object created by additive manufacturing is composed of two materials that look the same to the human eye, but shows different values when subjected to a non-destructive analysis. The non-destructive analysis includes spectroscopy.

Figure 2:
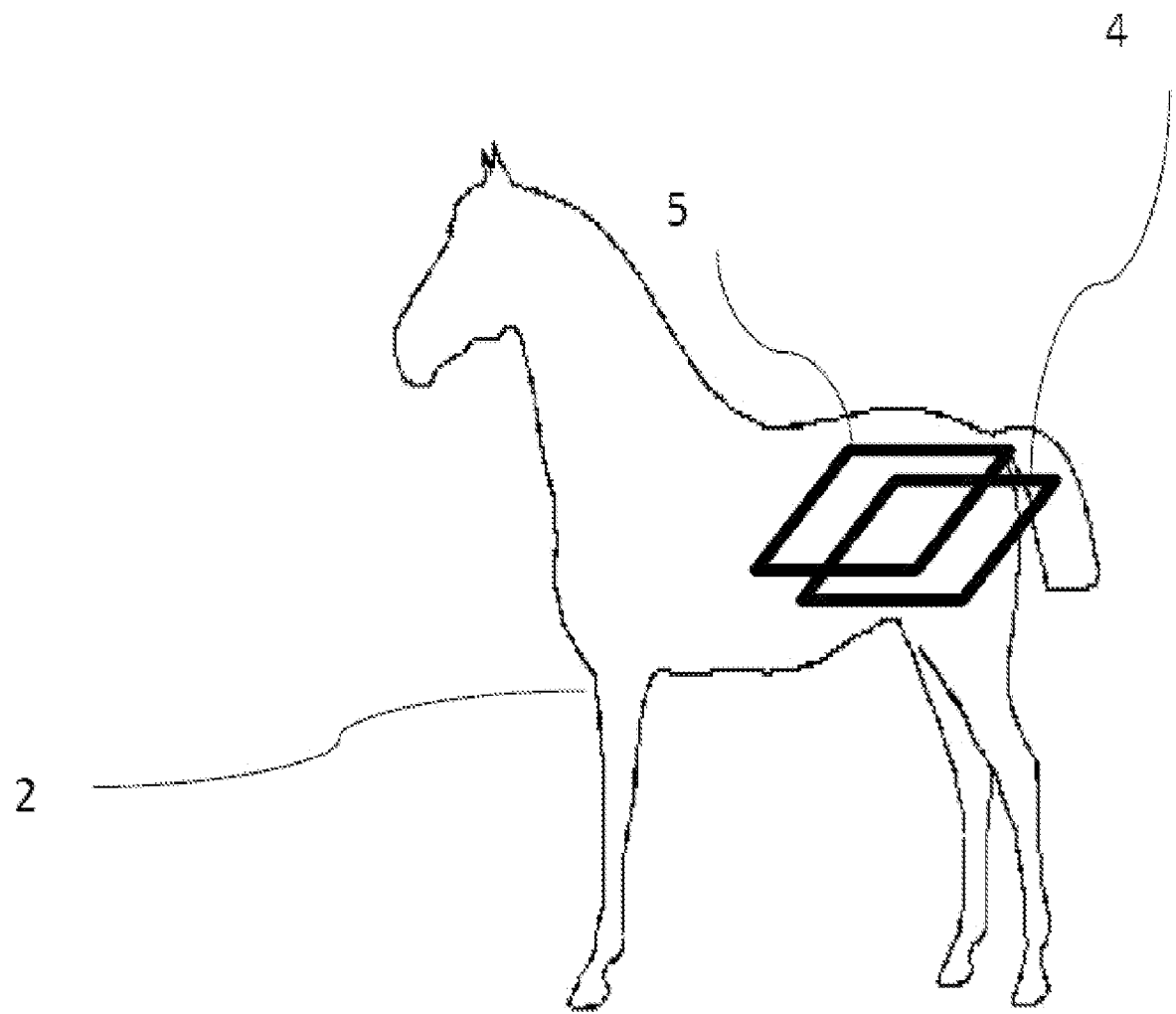
FIG. 2 is a diagram illustrating a 3D-printer using differential printing media to create a spectroscopically-tagged authorized version of an object, according to an embodiment of the disclosure.

FIG. 2 is a diagram illustrating an authorized 3D-printed object 2 containing a sub-surface layer 4 of taggant or differential media, and a surface layer 5 of a different material, implemented on a particular spot on the product.

To describe this in a different way, an additive manufacturing method is carried out so that the resulting object is composed of materials that look the same to the human eye, but different to a non-destructive analysis. The non-destructive analysis includes spectroscopy, and the authenticity of the object may be determined.

Figure 3:
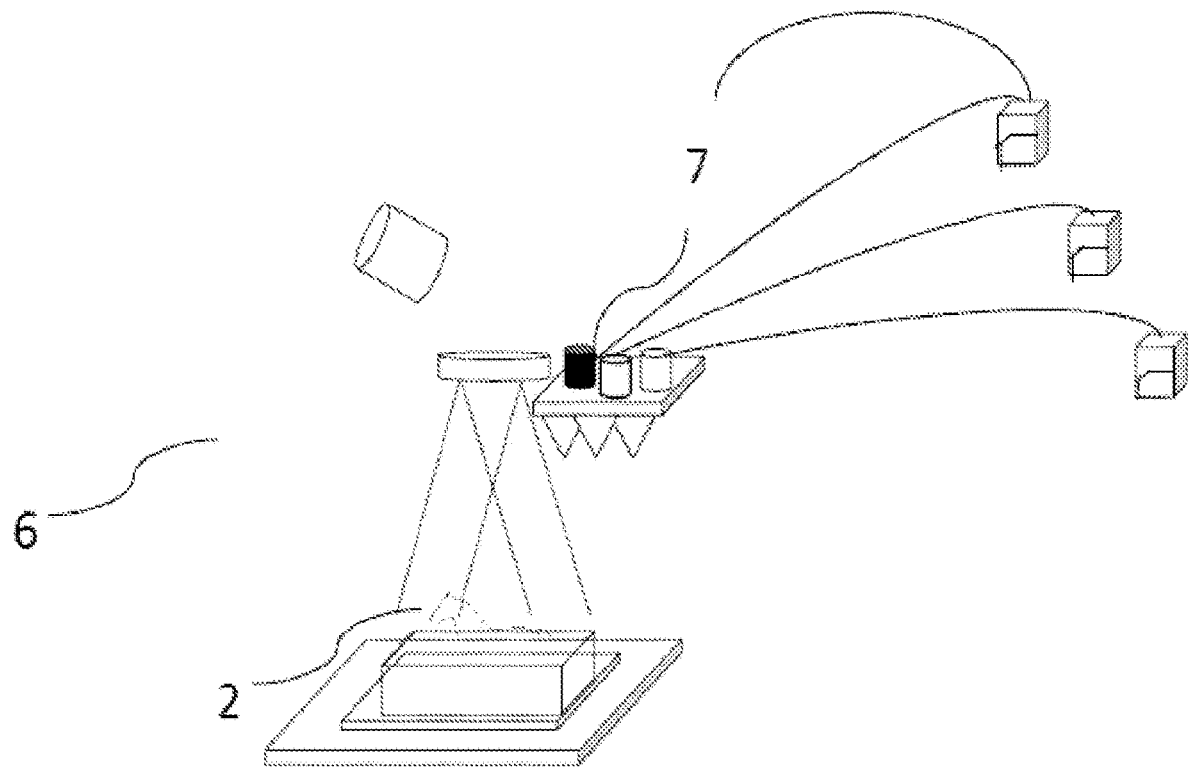
FIG. 3 is a diagram of a 3D printer that portrays the result of employing different chemicals to create a 3D object with taggant source material or controlled media formulation variation, according to an embodiment of the disclosure.

FIG. 3 is a diagram of a 3D printer 6 that portrays the result of employing different chemicals to create a 3D object 2 with taggant source material 7 or controlled media formulation variation. In this embodiment, one of the three media used to create the 3D object is detectable by spectroscopic or similar means (explained in detail in FIGS. 15 through 24), and it is mixed in or layered in as the object is printed.

To describe this in a different way, a manufacturing method creates an object, with one material having a first value when subjected to non-destructive analysis such as spectroscopy, and a second material with a different, second value when subjected to non-destructive analysis, and then more of the first material, making the second material invisible to the human eye. The second material when subjected to non-destructive analysis indicates information such as the authenticity of the object.

In other words, an object, created by additive manufacturing, has one material having a first value when subjected to non-destructive analysis such as spectroscopy, and a second material with a different, second value when subjected to non-destructive analysis, and then more of the first material, making the second material invisible to the human eye.

In the simplest embodiment, a single taggant is applied as an outer or near-final, non-surface ("under-the-skin") layer on the near-finished object. Layers range from 16 to 100 microns in current commercial printers, but it is easy to imagine that the principle of tagging applies regardless of the exact thickness.

Figure 4:
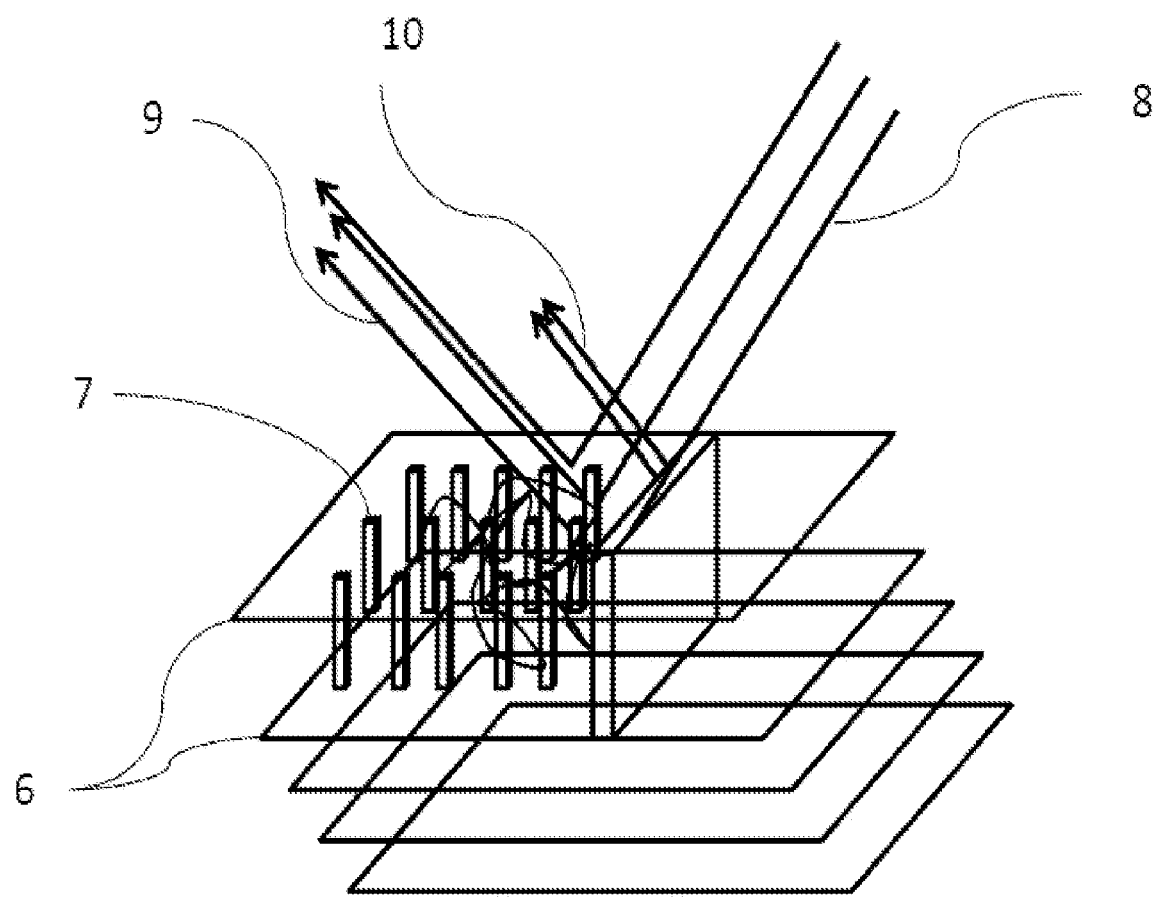
FIG. 4 is a diagram illustrating light scattering caused by diffuse reflection on a 3D-printed object containing a sub-surface layer consisting at least partly of open space, according to an embodiment of the disclosure.

Other tagging options include:
a. Applying a mix of chemicals to create an outer layer of taggant
b. Applying chemicals to create a taggant that is applied on a part of the object at the outer layer
c. Applying chemicals to create a taggant that is close to the outer layer (within the 1 mm-2 mm depth path length for detection using near-infrared spectroscopy, for example), but not the outer layer
d. Using a mix of chemicals and air chambers to create a taggant fingerprint that leverages the ability of, for example, near-infrared spectroscopy to take into account particle size and thickness
e. Using an authorized printing medium or mix of media to serve as a fingerprint, for example in the case of a spare part that must be of a certain strength and flexibility FIG. 4 is a diagram illustrating light scattering caused by diffuse reflection on a 3D-printed object containing a sub-surface layer 7 consisting at least partly of open space. The layer 7 layer containing empty spaces for channels, with supporting pillars is created atop other layers 6 of an object in order to create, for example, channels. Potential uses for space-containing layers include biologic implants where internal structures or channels are marked so flow can be monitored spectroscopically Spectroscopic detection of the space-containing layer occurs when incident light 8 bounces off the material and spaces, creating both diffuse reflected light 9 and specular reflected light 10.

When light shines onto a sample with spaces, it is reflected in all directions, as shown in FIG. 4. Due to the variety of surfaces, light is reflected in many directions, unlike light reflected from a mirror. The remainder of the light is refracted as it enters the layers, where it is scattered due to internal reflection, or reflection from the surfaces of other layers. Some of this scattered light is emitted back into the air. As the diffuse reflected light is reflected or passes through the layers, it becomes weaker if absorption by the layers occurs. This results in a diffuse reflected spectrum.

Figure 5:
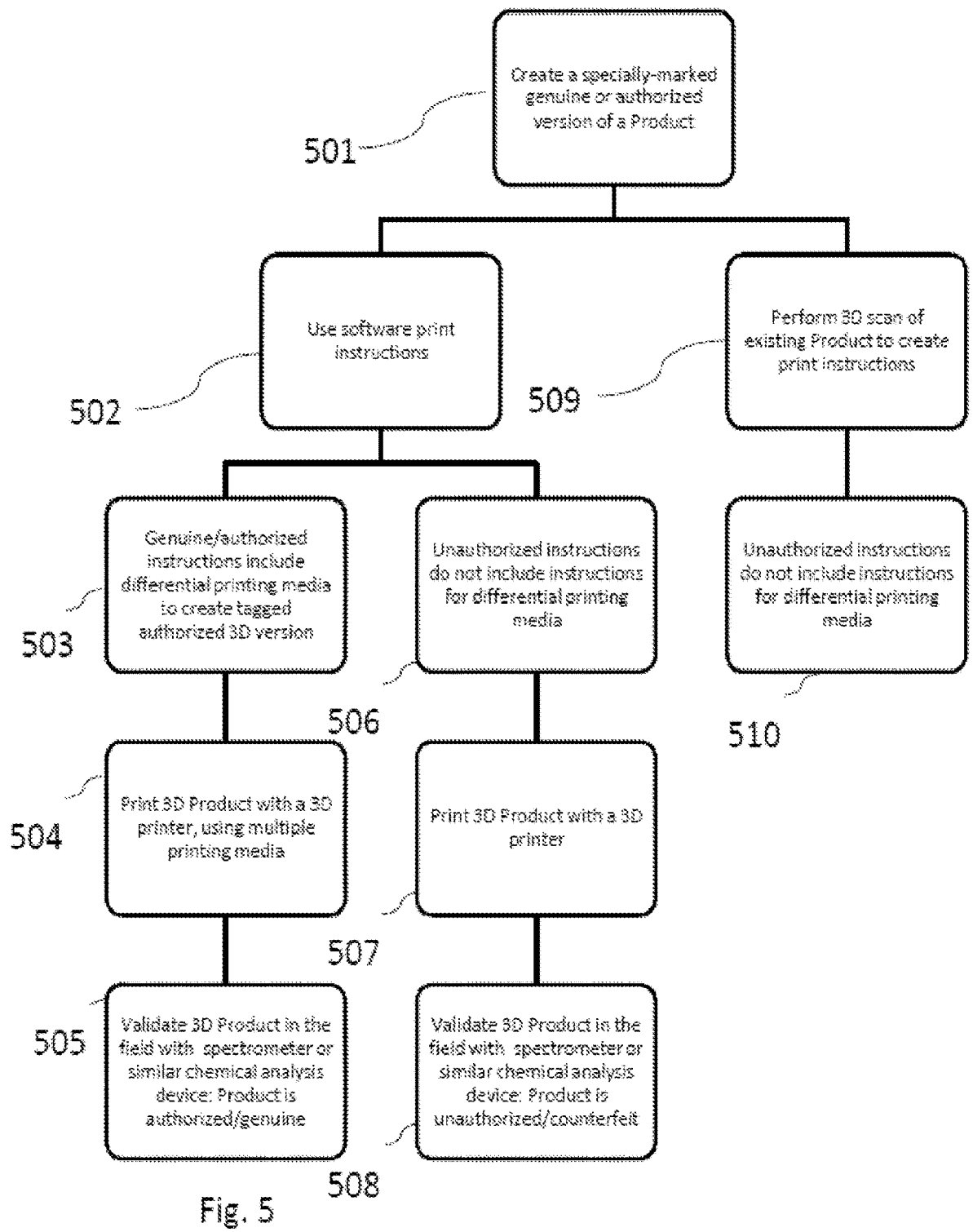
FIG. 5 is a conceptual chart illustrating the use of software instructions to manage the layered spectroscopically-detectable taggant used to create an authorized 3D-printed object, according to an embodiment of the disclosure.

FIG. 5 is a conceptual chart illustrating a process 501 of an example of a method for distinguishing authorized 3D-printed objects from non-authorized versions. Printing can be accomplished either using specifically created software 502 as instructions, or by creating instructions by first scanning an existing object 509, generally through the use of light or radiation. Here, creating instructions from an existing object 509 is considered an attempt at counterfeiting 510, or at least not an authorized copy, unless accompanied by an authorization code. In the case where printing follows software instructions, those instructions could be authorized (e.g. purchased and downloaded) 503, or they may be rogue 506, or not authorized for the creation of genuine branded products or parts.

Authorized instructions 503, according to the present invention, include information that directs materials to be added to the printed object in a special way 504 that can later be detected with a chemical analyzer, e.g. spectrometer 505. The spectrometer distinguishes authorized 3D printed Products from unauthorized 507, 508, using knowledge of the expected material(s) and its profile, where it is located in the product, and even quantitative information as to how thickly the expected material is layered in the product.

Figure 6:
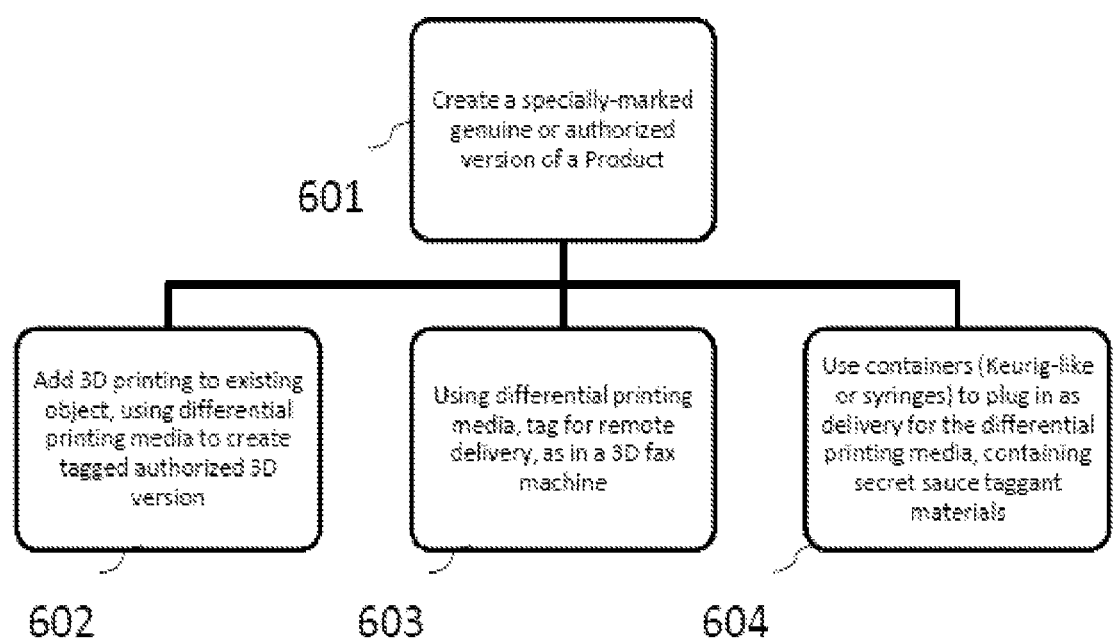
FIG. 6 is a conceptual chart illustrating delivery modes for spectroscopically-detectable taggant, according to an embodiment of the disclosure.

FIG. 6 is a conceptual chart illustrating examples of methods for placing the layers of taggant into an authorized 3D product during the printing process 601. Delivery modes include adding layers to an existing object using 3D printing 602. The fingerprinting can still be accomplished, using differential printing media to create a tagged authorized 3D product. In the preferred embodiment, the added layers are UV-cured resins.

A use case for adding layers to an object could be adding a safety fix to an object subject to recall: if the buckle on a child safety seat contains a sharp area that could scratch a child, the manufacturer could provide a blueprint and materials to coat the sharp area. Authorized fixes would allow the seats to be resold; showing that a fix was unauthorized could protect the manufacturer from lawsuits.

The additions, or the whole product, can be printed with 3D printing but with a spatial separation between the instructions and the delivering printer, as in a 3D fax machine, or distributed manufacturing, with simultaneously printed product generated from a central recipe to one or more non-adjacent 3D printers 603. Again, the fingerprinting can still be accomplished, using differential printing media to create a tagged authorized 3D product, in this case deliverable remotely.

The differential printing media for fingerprinting can be added to the product in exactly the same way as the other printing media, or they can use a different system 604 to ensure, for example, ease of use or secrecy. For example, they can be delivered in sealed cartridges akin to the Keurig container system for coffee and tea. In the case of fused deposition modeling, a syringe can add taggant alongside a particular filament as it is melted to be layered onto an object during printing.

Figure 7:
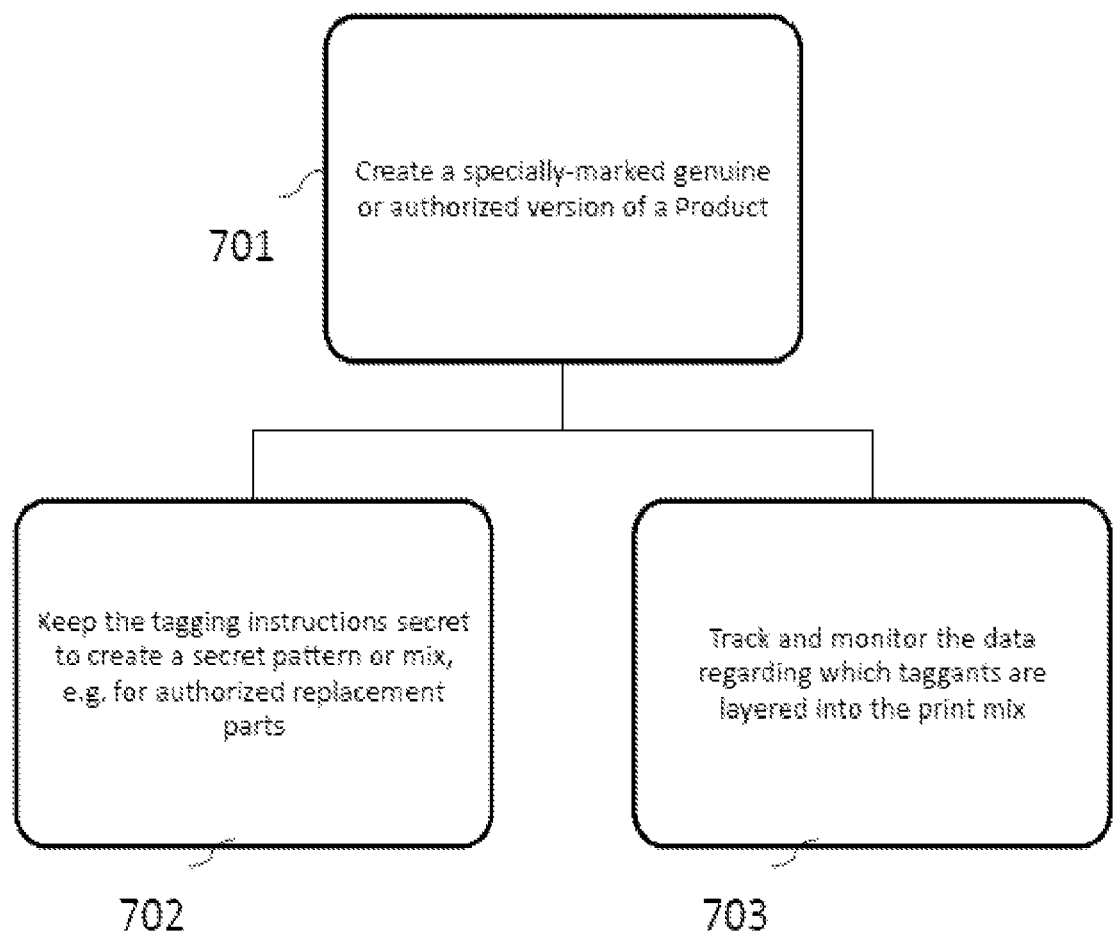
FIG. 7 is a conceptual chart illustrating secrecy management for spectroscopically-detectable tagging of an authorized 3D-printed object, according to an embodiment of the disclosure.

FIG. 7 is a conceptual chart illustrating the manipulation of data for 3D printer management to create spectroscopically-authenticable authorized versions 701. Data monitoring and secrecy may be important to the creation of authorized versions and the prevention of counterfeiting. Beyond simply keeping the differential printing media instructions secret 702, the software containing them can be encrypted. Furthermore, the data regarding which taggants are layered into the print mix, and how, can be monitored and tracked so as to preserve secrecy 703.

To describe this in a different way, an additive manufacturing apparatus with at least two feedstocks uses a data file with an encrypted portion, which the user cannot read, to determine which feedstock is used at what stage of the manufacturing. The data file may direct the apparatus to use analytical means such as spectroscopy to check the second feedstock.

Figure 8:
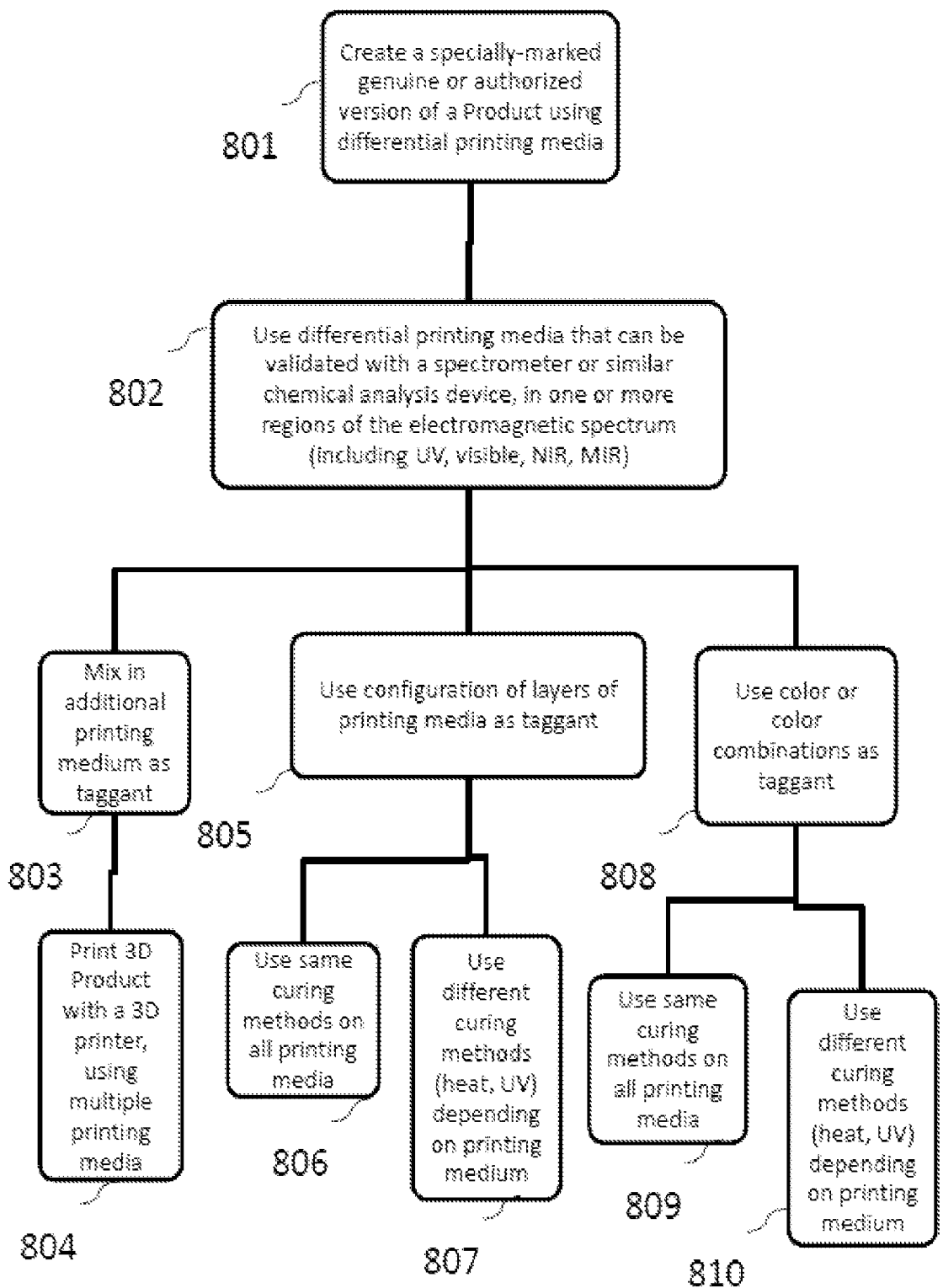
FIG. 8 is a conceptual chart illustrating mix, layering, and color options for spectroscopically-detectable tagging of an authorized 3D-printed object, according to an embodiment of the disclosure.

FIG. 8 is a conceptual chart illustrating mix-layer-color variant manipulation as examples of methods for distinguishing authorized 3D-printed objects from non-authorized versions 801. Fingerprinting can be varied with several different techniques and validated with one or more analytical devices 802. For example, it is possible to mix in an additional printing medium as a taggant 803 and then print 804, or reuse a printing medium but in different layers 805 or in a different location on the product. It is also possible to vary the curing methods. For example, some printing media are cured using heat, others using ultraviolet light (UV). Some existing printers use only one type of cure 806, 809, but it is certainly possible to employ more than one 807, 810, and it may be beneficial for fingerprinting purposes to use materials that have different cure types.

Color or color combinations can be used as taggants 808, and not merely in such a way as to be visible to the naked eye. A color layer may be incorporated in an obscure place, in the same way that a blue credit card may have a green edge for enhanced anti-counterfeiting protection. Color may be used in ways that are scarcely detectable by a human, but show up in spectra beyond the visible region.

The 3D Systems ZPrinter, for example, prints in multiple colors, automatically monitoring print color canisters and cartridges.

The 2014 Stratasys Objet500 Connex3 uses triple jets to create three distinct materials in one build tray, for multiple mixes of materials and colors. With 14 base materials, up to 82 material properties can be included in a single build, with 16-micron layer thickness. Material options include over 1000 digital materials and base resins to choose from. The ability to spray resins from multiple jets, and then cure them with UV light, facilitates the layered anti-counterfeiting taggant approach described here.

The 2011 Objet Connex Multi-Material 3D printer uses 16-micron layers. FullCure resin is loaded in cartridges. To date, these multi-material printers have aimed at colorful prototypes and, for example, plastic objects with rubberized handles. The innovation proposed here is to leverage the availability of multiple materials for anti-counterfeiting and detect them with a spectrometer or similar device 802.

The 2010 Polyjet Connex500 uses resin-based rigid materials to simulate ABS plastic, along with soft material options and includes four material types and two UV curing lights.

In one embodiment, the taggant can be cured with lights that are integrated into the application nozzles. In another embodiment, one or more curing lights can function separately from the nozzle(s) layering down the media.

Figure 9:
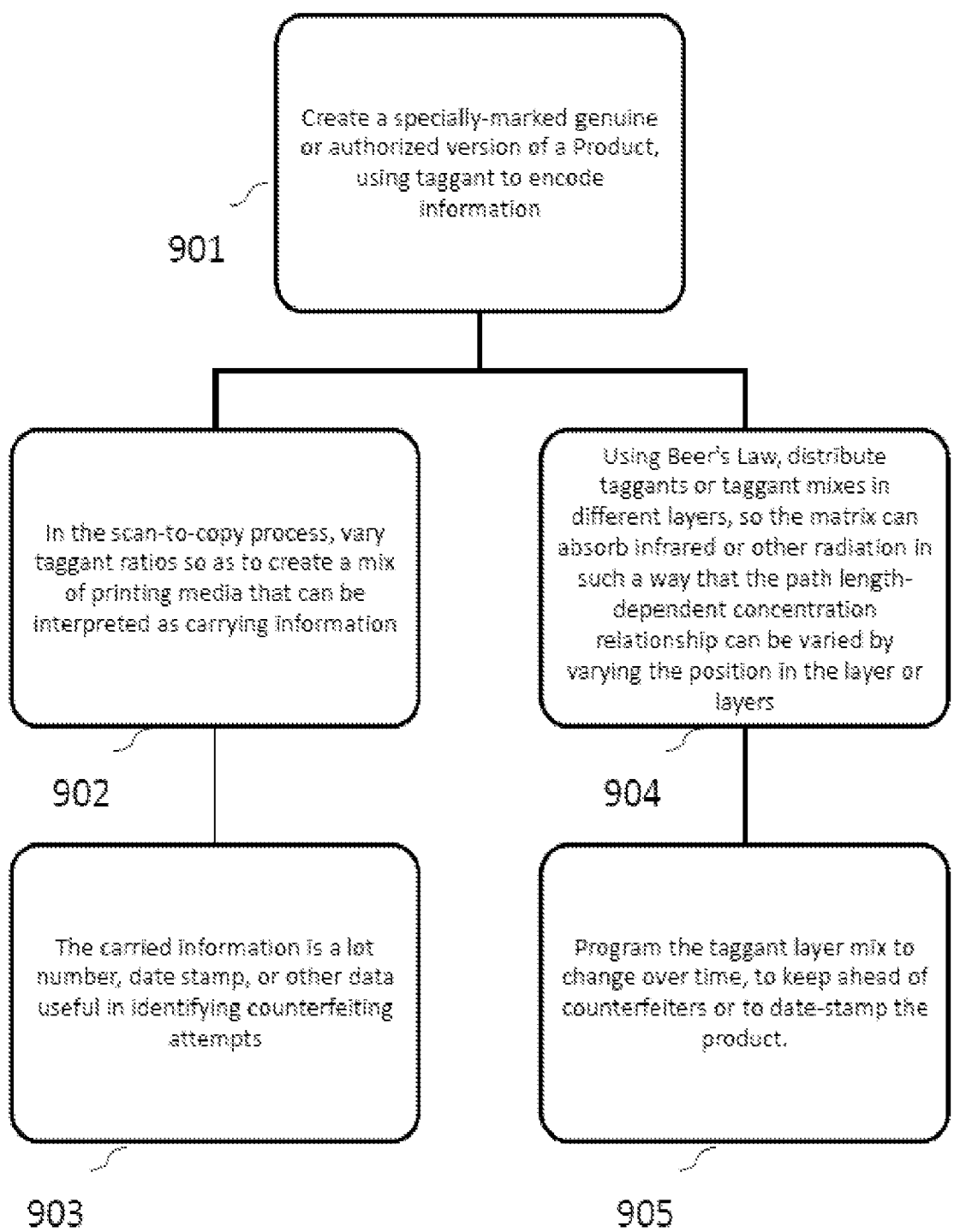
FIG. 9 is a conceptual chart illustrating the use of spectroscopically-detectable tagging for encoding of product data, according to an embodiment of the disclosure.

FIG. 9 is a conceptual chart illustrating the manipulation of data for 3D printer management to create spectroscopically-authenticable authorized versions that carry useful data 901. By encoding information such as date, the spectral fingerprint can carry data. For example, a particular mix (and location, thickness, and so on) of printing media can be linked to a date and location of manufacture 903, as a kind of covert tag. The tagging scheme can be set to vary, using one of several methods. For example, as part of the scan-to-copy process, taggant ratios can be varied so as to create a mix of printing media that can be interpreted as information-carrying 902. In another embodiment, using Beer's Law, taggants or taggant mixes can be distributed in different layers, so the matrix can absorb or transmit infrared or other radiation in such a way that the path length-dependent concentration relationship can be varied by varying the position in the layer or layers 904. Use of Beer's law with transparent and translucent objects produced by 3-D printers is feasible via number of taggant-containing layers that are built up, and also by location in a given layer by taggant pulsing as the layer is fed thru the appropriate nozzle or nozzles. This can provide a two- or three-dimensional distribution matrix for taggants.

Furthermore, the taggant layer mix can be programmed to change over time 905, for example to date-stamp the product, or simply to keep ahead of counterfeiters.

In one embodiment, the data encoding can be employed with a printer such as the Optomec Aerosol Jet (2012), because it can dynamically mix materials on the fly during the deposition process, including functionally graded materials (gradual switch from 100% one material in one area to 100% another material in another).

Figure 10:
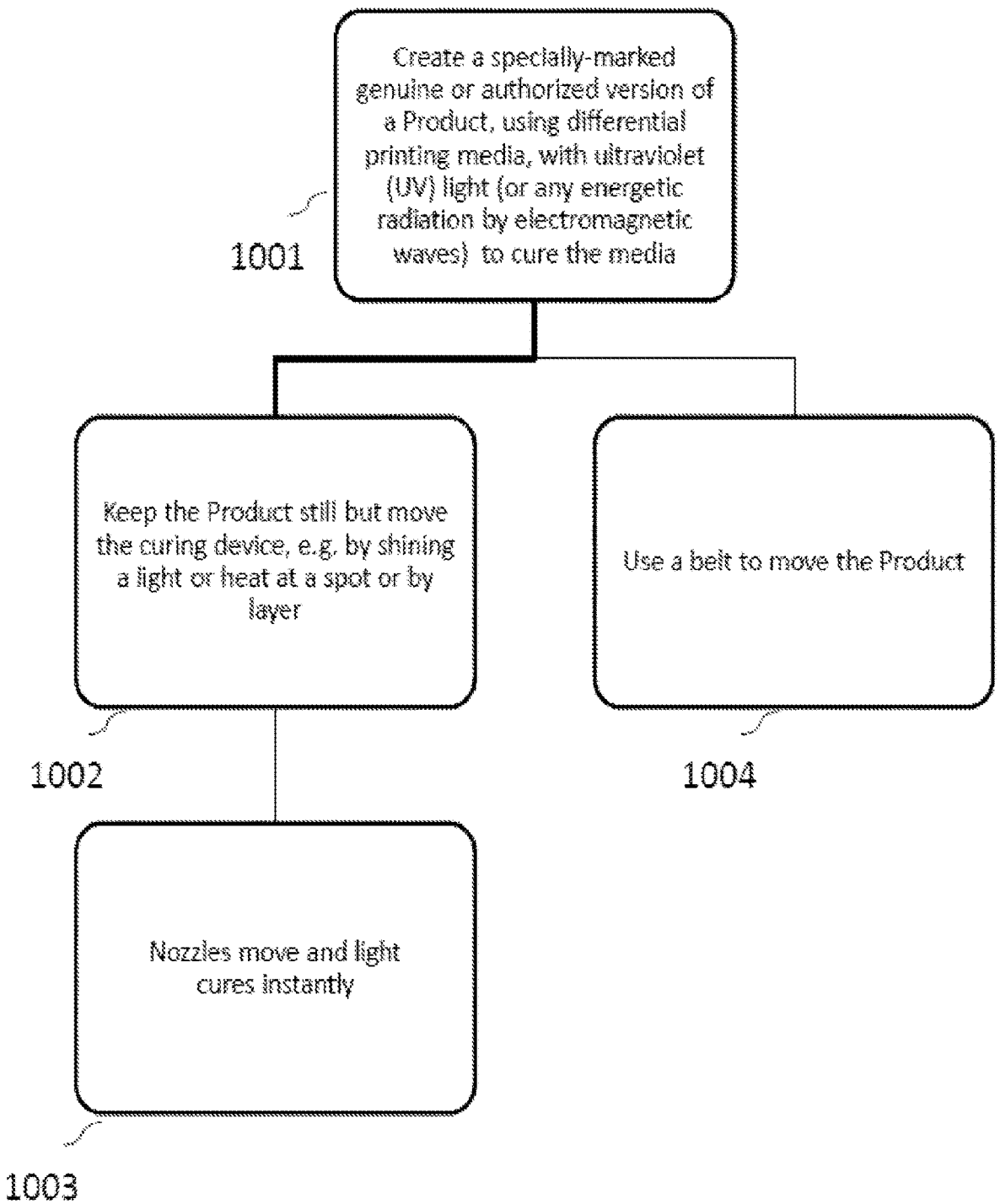
FIG. 10 is a conceptual chart illustrating curing methods for spectroscopically-detectable tagging of an authorized 3D-printed object, according to an embodiment of the disclosure.

FIG. 10 is a conceptual chart illustrating cure manipulation as examples of methods for distinguishing authorized 3D-printed objects from non-authorized versions 1001. Cure options may be manipulated in order to make it easier to deliver various printing media for fingerprinting. For example, the product may remain fixed but the curing device can move or be varied 1002, e.g. by shining a light or applying heat at a spot or by layer. The printing media may be delivered by nozzles that move 1003; light may be used in that case to provide an instant cure, layer by layer, spot by spot. It is also possible to use a belt to move the product, relative to the printing media and curing device(s) 1004.

Figure 11:
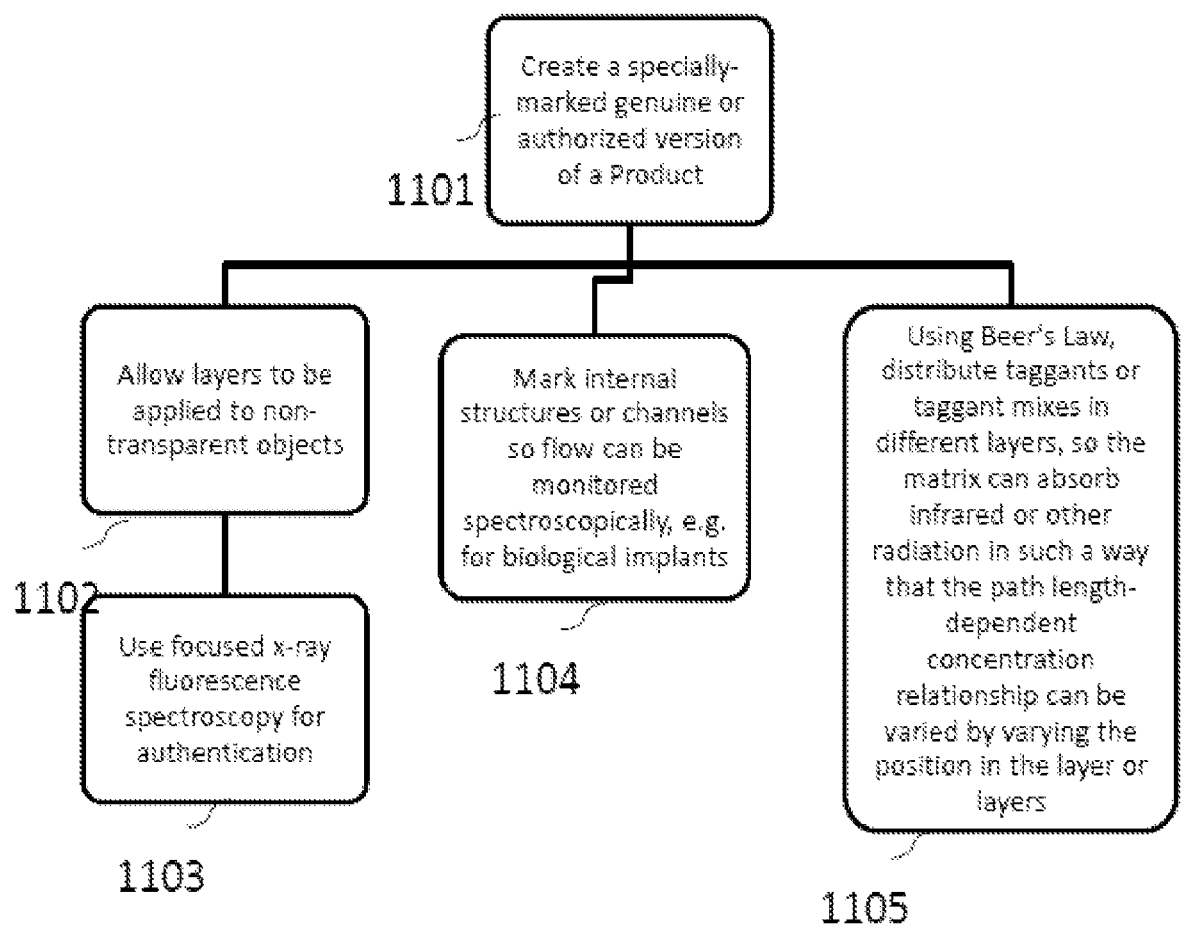
FIG. 11 is a conceptual chart illustrating structuring methods for spectroscopically-detectable tagging of an authorized 3D-printed object, according to an embodiment of the disclosure.

FIG. 11 is a conceptual chart illustrating structuring manipulation as examples of methods for distinguishing authorized 3D-printed objects from non-authorized versions 1101. Structuring methods may be further varied as well. For example, layers may be applied to objects that are either transparent or not transparent in the visible region of the electromagnetic spectrum 1102. In this case focused x-ray fluorescence spectroscopy may offer the best choice for authentication 1103. Again, using Beer's Law, taggants or taggant mixes can be distributed in different layers, so the matrix can absorb infrared or other radiation in such a way that the path length-dependent concentration relationship can be varied by varying the position in the layer or layers 1105.

Mid-IR reflection spectrometry can be employed with smooth surfaces and films, where the object is not sufficiently transparent for absorbance measurements. Specular reflection and attenuated total reflectance techniques are appropriate with these types of samples. Beer's law is obviously not relevant with these types.

For some applications, for example biological implants, it will be desirable to have internal structures or channels 1104. These, too, can be fingerprinted and validated, as follows: use differential printing media to mark internal structures or channels so flow can be monitored spectroscopically. Note that since most bioprinting media have a gel-like consistency, scaffolding, removable or otherwise, is often part of the 3D printing process. The anti-counterfeiting fingerprint can be in the removable scaffold, or it can be embodied in the relative density of the materials vs. flow channels, for example, by exploiting the sensitivity of near-infrared spectroscopy to density and particle size.

Porosity, channels, density and strand diameter variations can also be used as taggant methods, where the detecting instrument (e.g. a near-infrared spectrometer) measures material density or layer thickness. Such printing is possible, for example, with the EnvisionTec 3D-Bioplotter (2014).

Figure 12:
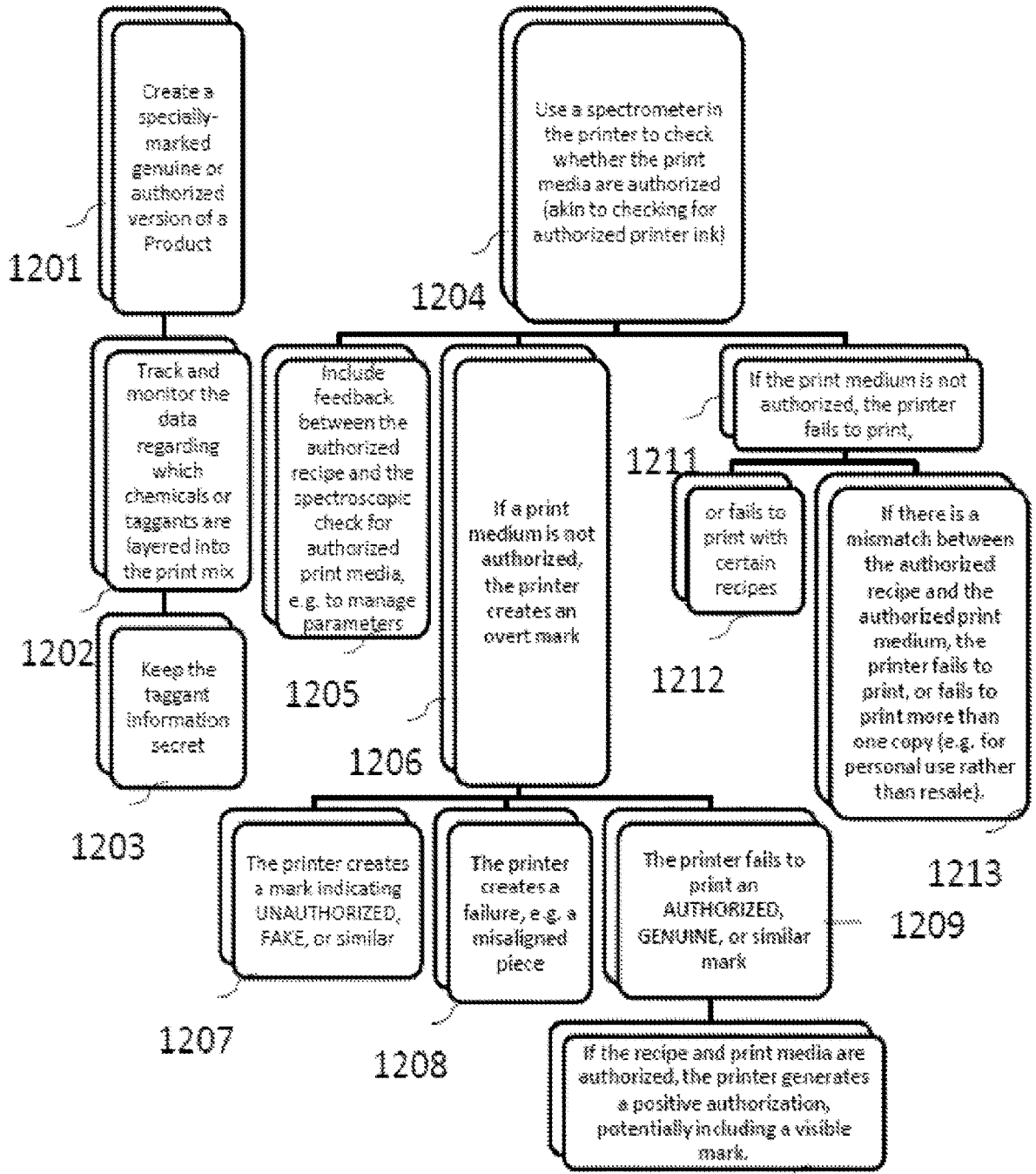
FIG. 12 is a conceptual chart illustrating an authentication system for validating print media using a spectrometer integrated into a 3D printer, according to an embodiment of the disclosure.

FIG. 12 is a conceptual chart illustrating a process of an example of a method for distinguishing authorized 3D-print media from non-authorized versions, along with enforcement options 1201. It may be desirable to authenticate the printing media 1202 as well as the resulting product, and in some cases there may be a feedback loop between the two 1205. It may be desirable to keep the taggant information secret from the printer user 1203, encrypting it into the software instructions to the printer. To validate that the printing media are authorized (akin to a printer checking for authorized printer ink), a spectrometer may be incorporated into the holding container through which printing media are dispensed 1204.

To describe this in a different way, an additive manufacturing apparatus with at least two feedstocks uses programmable means to determine which feedstock is used at what stage of the manufacturing. The programmable means may direct the apparatus to use analytical means such as spectroscopy to draw on the second feedstock only if certain conditions are met.

There are several possible ways, often involving software, to enforce the use of authorized printing media. Some may be positive: for example, if the media are genuine, the printer creates a positive authorization 1210, potentially including a visible mark, such as AUTHORIZED, GENUINE, or similar mark 1209. Others may be negative: the printer may create a mark indicating UNAUTHORIZED, FAKE, or similar 1206, 1207. Or the printer may intentionally create a failure 1208, e.g. a misaligned piece.

Checking for authorized media can be combined with checking for authorized instructions. For example, a weight-bearing part may need to be created using special heavy-duty printing media, and if the medium is wrong, the part is unauthorized because it may fail in use. In case of a mismatch between the authorized recipe and the authorized print medium, the printer fails to print 1211, 1212, or fails to print more than one copy (e.g. for personal use rather than resale) 1213.

An additional benefit of communication between the spectrometer and print controller is the ability to customize print instructions for different media. The current state of the art requires user manipulation of parameters in order to reset print conditions (such as distance and curing time). The spectrometer can "read" the print media directly and generate computer commands as managed by software in the printer, to enable the printer to adjust automatically. Thus it is possible to provide, for example, an updated formulation of a resin that, via the spectrometer, essentially sets its own new print conditions, a considerable gain in convenience.

Figure 13:
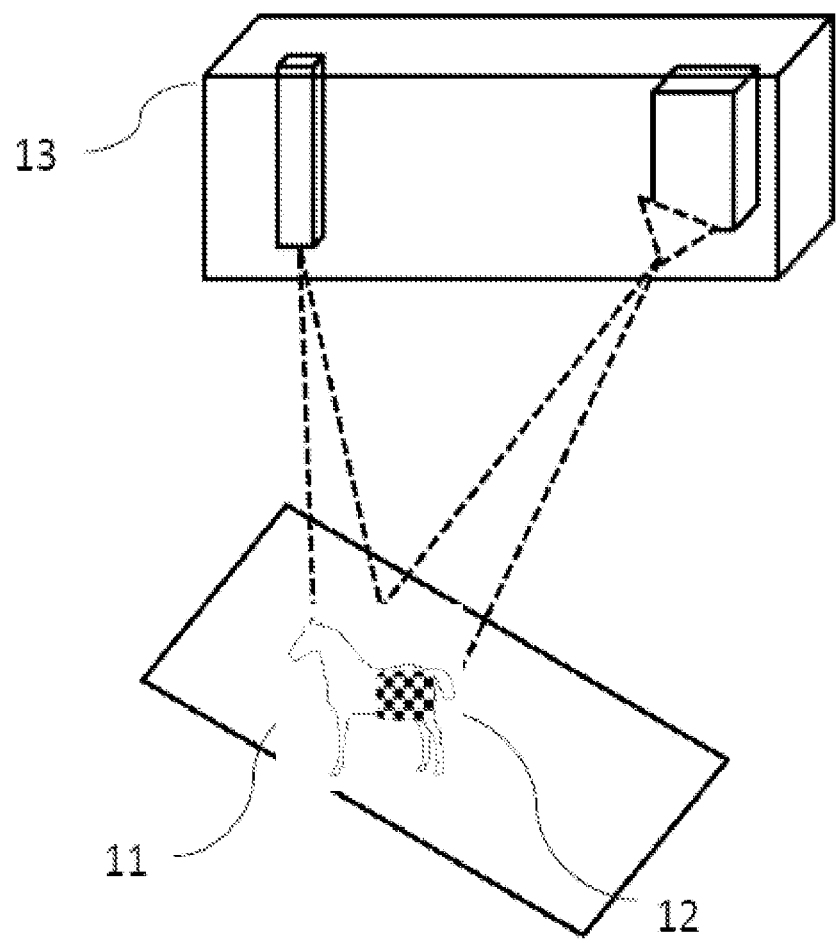
FIG. 13 is a diagram illustrating an example of a system for authorizing or prohibiting 3D scanning of non-authorized versions of a 3D object, according to an embodiment of the disclosure.

FIG. 13 is a diagram illustrating an example of a system for authorizing or prohibiting 3D scanning of non-authorized versions of a 3D object. Scanning and unauthorized copying may be inhibited with an overt or covert mark on an authorized product 11 that is interpreted by the scanner 13 or 3D printer. In this use case, a small QR (quick response, machine-readable) or texture code 12 appears on a genuine product but sends a signal interpreted by a scanner to inhibit or limit 3D copying. Furthermore, the code can identify and communicate via the Internet with interested parties, or indicate that it requires an authorization code to continue.

To describe this in a different way, a 3D scanner generates a data file indicating the 3D shape of a scanned object, and reads an indicator mark, which may be a QR (quick response) or texture code, which causes it to let the user know, to stop the scan, and/or to let others know. In other words, a 3D scanner is used to generate a data file indicating the 3D shape of a scanned object, and read an indicator mark, which may be a QR (quick response) or texture code, causing it to let the user know, to stop the scan, and/or to let others know.

Figure 14:
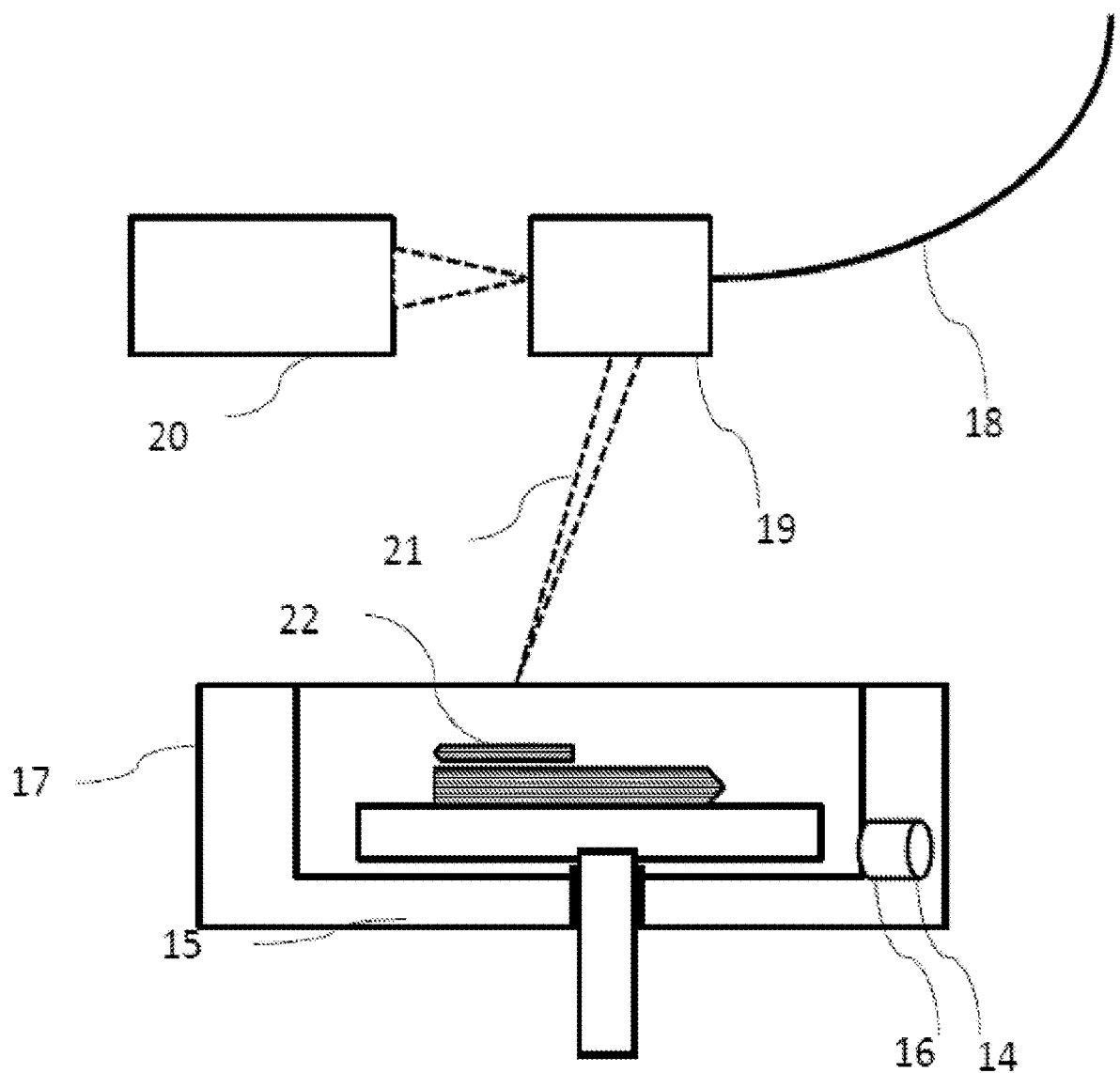
FIG. 14 is a diagram illustrating a stereolithographic 3D printer with an authentication system for validating print media using a spectrometer integrated into the vat, according to an embodiment of the disclosure.

FIG. 14 is a diagram that illustrates a device for monitoring the use of authorized print media in a 3D printer, along with enforcement options. A 3D printer, in particular one using UV-cured resins for stereolithography, can use a spectrometer 14 for multiple purposes. The spectrometer, in the preferred embodiment a near-infrared or Raman spectrometer mounted so that it can validate liquid photopolymer resin 15 through a sapphire window 16 into a vat 17, can authenticate the resin, and, once authenticated, can convey print parameters 18 to the scanner 19 and 3D printer without the need for human operator intervention. Such parameters may include distance to the light source, cure time, particular wavelengths for ultraviolet light curing using a laser beam 21 from a laser 20, and so on. In addition, the spectrometer can be used to enforce the use of authorized printing media by causing positive or negative results as noted above.

To describe this in a different way, an additive manufacturing apparatus has a spectrometer monitoring a feed stock area, passing and information and taking action based on the information, including marking or changing the piece being manufactured. In other words, in one example, a UV-curing additive manufacturing apparatus uses a spectrometer monitoring a feed stock area to determine UV curing characteristics including duration, distance, and wavelengths.

Detection of the taggant or differential print media is accomplished using an analytical instrument, which is in the preferred embodiment a handheld spectrometer. The following section explains the types of spectroscopy that can be used to detect differential materials, including plastics and beyond, both on the outer layer of a 3D-printed object and also, in certain cases, in inner layers. For example, Raman microscopy can analyze multilayer polymer films. Conventional Raman microscopy, which has spatial resolution as small as a micron, can analyze cross sections of multilayer polymer films. Confocal Raman microscopy can generate depth profiles of the multilayer films, with no requirement for cross sectioning.

Figure 15:
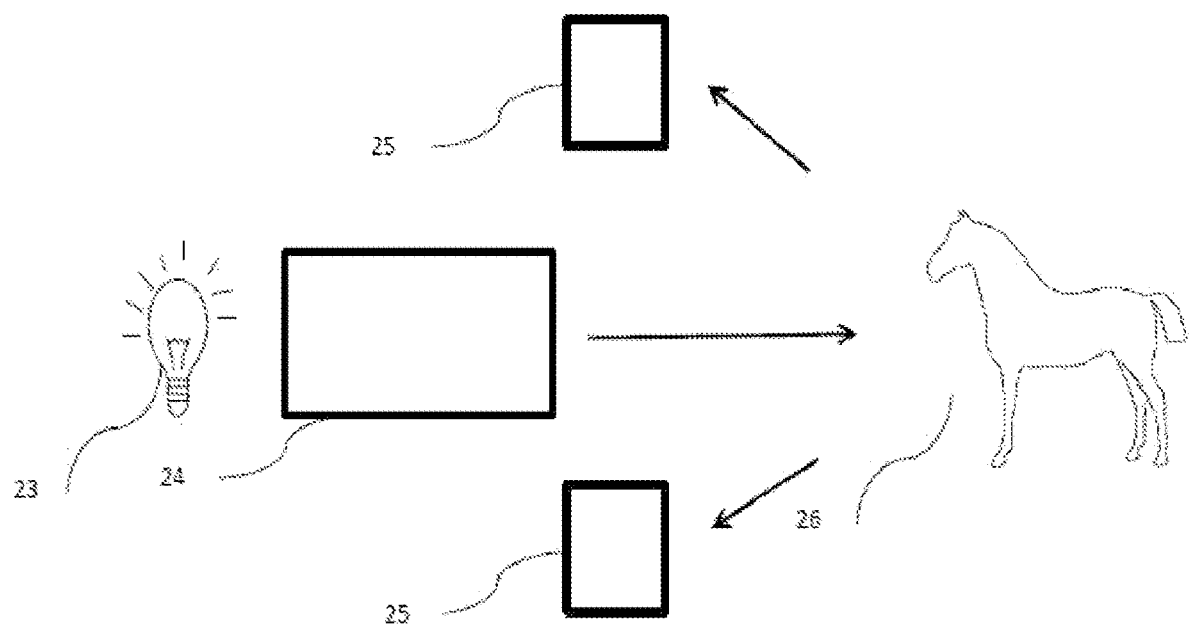
FIG. 15 is a diagram illustrating authentication of a 3D-printed object using near-infrared (NIR) spectroscopy, according to an embodiment of the disclosure.

FIG. 15 is a diagram illustrating authentication of a 3D-printed object 26 using near-infrared (NIR) spectroscopy. NIR spectroscopy is based on the molecular overtone and combination vibrations arising from the fundamental molecular vibrations of the mid-infrared (Mid-IR) region of the electromagnetic spectrum. Detection of diffusely reflected NIR energy occurs when energy arising from an incandescent light source 23, is attenuated by a monochromator 24, reflected from the outermost surface layers of solid materials, in this case of a 3D-printed object 26, and interacts with an instrument consisting of a detector 25 composed of silicon and a composite of indium and gallium arsenide (InGaAS) materials.

To describe this in a different way, an object created by additive manufacturing is tested for authenticity using non-destructive analysis such as spectroscopy. One material in the object has a first value when subjected to non-destructive analysis such as spectroscopy, and a second material, although it looks similar to the human eye, has a different, second value when subjected to non-destructive analysis. Subjecting the materials to non-destructive analysis indicates information such as the authenticity of the object.

In other words, an authenticity determination method can be used for an object created by additive manufacturing, with one material having a first value when subjected to non-destructive analysis such as spectroscopy, and a second material with a different, second value when subjected to non-destructive analysis, and then more of the first material, making the second material invisible to the human eye. The second material when subjected to non-destructive analysis indicates information such as the authenticity of the object.

Figure 16:
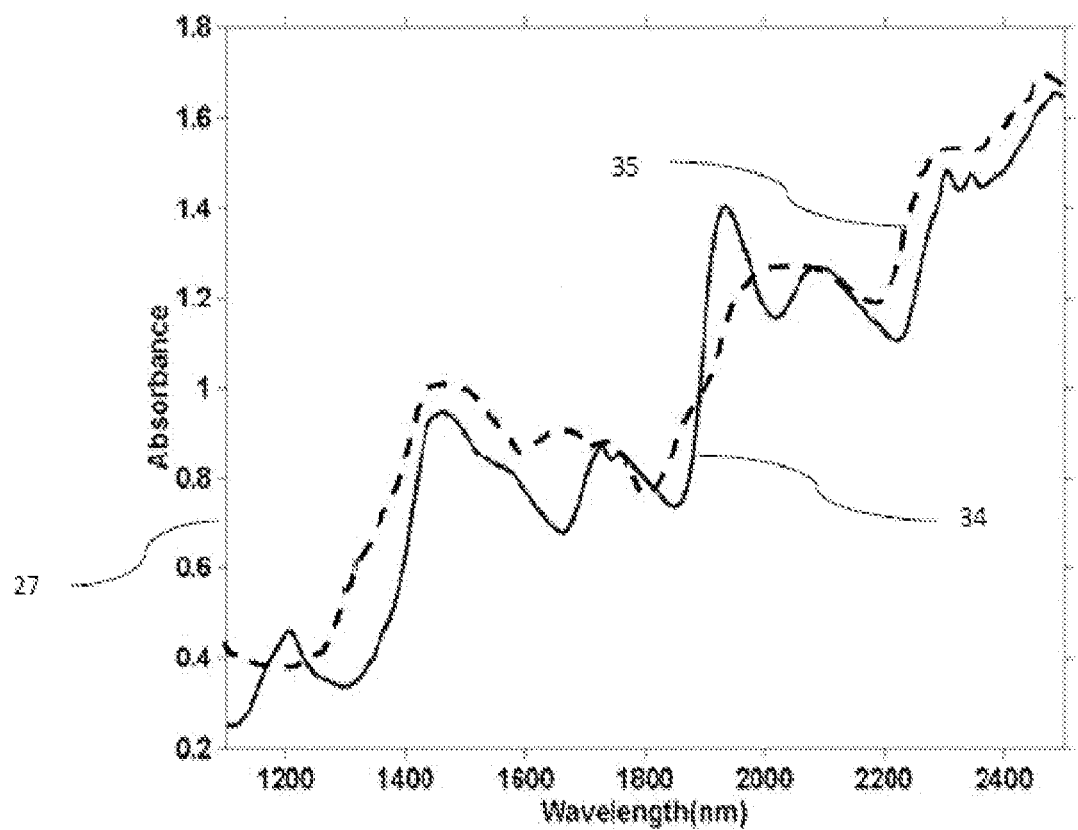
FIG. 16 is a diagram consisting of a graph of the near-infrared spectra of authentic and counterfeit 3D-printed objects, according to an embodiment of the disclosure.

FIG. 16 is a diagram consisting of a graph 27 of the near-infrared spectra of authentic 34 and counterfeit 35 3D-printed objects. The degree to which materials absorb and reflect NIR energy is a function of harmonic and an harmonic quantum oscillation, Fermi Resonance, Darling-Dennison Resonance, and the Local Mode Concepts, which taken together describe the NIR absorption spectrum 27. Because the molecular overtone and combination bands observed in the NIR spectrum are typically very broad, leading to complex spectra, it can be difficult to assign specific features to specific chemical components. Multivariate (multiple variables) calibration techniques (e.g., principal component analysis, partial least squares, or artificial neural networks) are often employed to extract the desired chemical and physical information from the spectra. Careful development of a set of calibration samples and application of multivariate calibration techniques is essential for near-infrared analytical methods.

Figure 17:
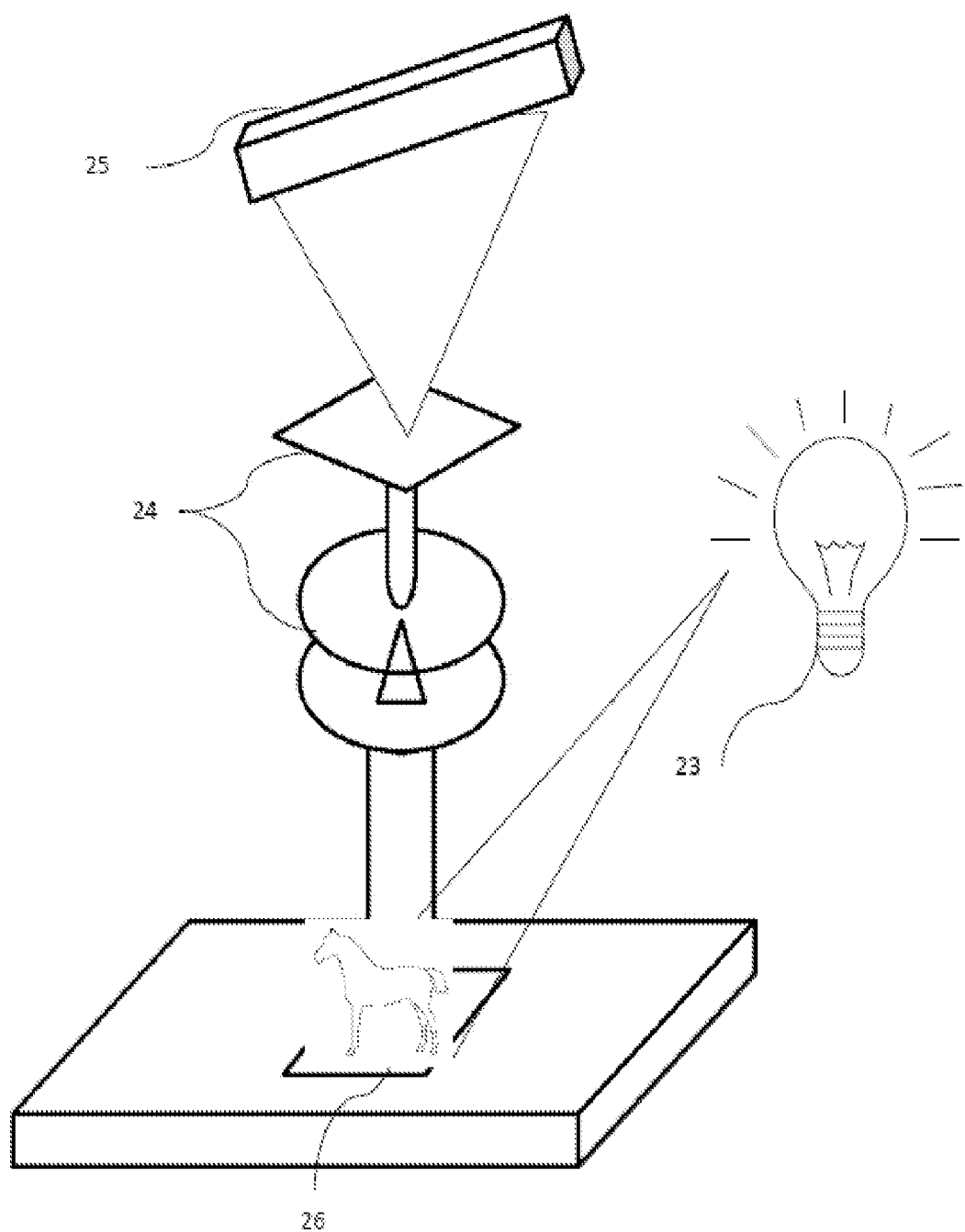
FIG. 17 is a diagram illustrating authentication of a 3D-printed object using ultraviolet and visible (UV/Vis) spectroscopy, according to an embodiment of the disclosure.

FIG. 17 is a diagram illustrating authentication of a 3D-printed object 26 using ultraviolet and visible (UV/Vis) spectroscopy. UV/Vis spectroscopy is based on electronic transitions of the atoms that constitute the molecular structure of materials. When a photon from a light source 23 strikes an electron in an atom, the photon is absorbed, causing the electron to transition from the ground state to an excited state. This is then passed to the detector 25. For detecting tagged 3D printed objects 26, different substances will absorb differently: molecules containing $\pi$-electrons or non-bonding electrons (n-electrons) can absorb the energy in the form of ultraviolet or visible light to excite these electrons to higher anti-bonding molecular orbitals. The more easily excited the electrons (i.e. lower energy gap between the ground state to the excited state molecular orbital), the longer the wavelength of light it can absorb. Light wavelengths are manifested as color (400 nm to 800 nm or violet, indigo, blue, green, yellow, orange and red) in the visible region, and as ultraviolet radiation (190 nm to 400 nm) in the ultraviolet region, after attenuation by a monochromator 24 resulting in UV/Vis spectra.

Figure 18:
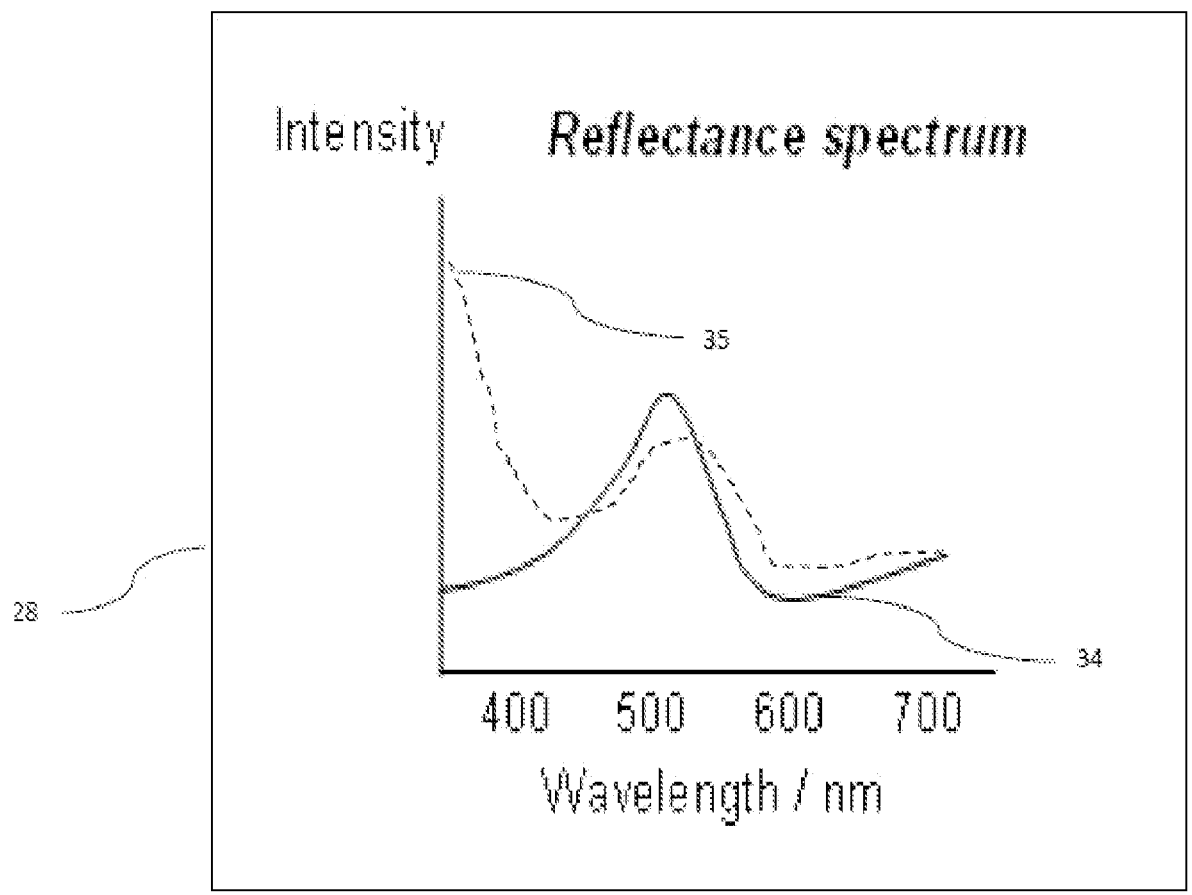
FIG. 18 is a diagram consisting of a graph of the UV/Vis spectra of authentic and counterfeit 3D-printed objects, according to an embodiment of the disclosure.

FIG. 18 is a diagram consisting of a graph 28 of the UV/Vis spectra of authentic 34 and counterfeit 35 3D-printed objects.

Figure 19:
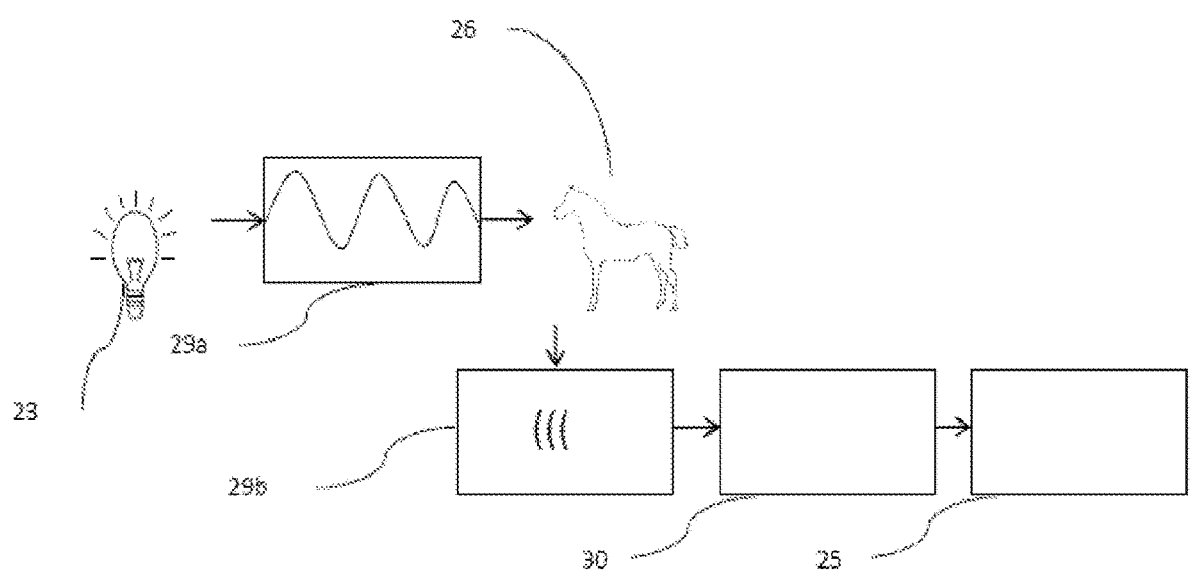
FIG. 19 is a diagram illustrating authentication of a 3D-printed object using fluorescence spectroscopy, according to an embodiment of the disclosure.

FIG. 19 is a diagram illustrating authentication of a 3D-printed object 26 using fluorescence spectroscopy. Fluorescence occurs when an orbital electron of a molecule, atom or nanostructure relaxes to its ground state by emitting a photon of light after being excited to a higher quantum state by some type of energy source 23. Detection by a detector 25 of the tagged 3D printed object 26 occurs when the energy of excitation and emission is attenuated by the excitation monochromator 29a and emission monochromator 29b and multiplied by the photomultiplier 30 that results in a fluorescence spectrum.

Figure 20:
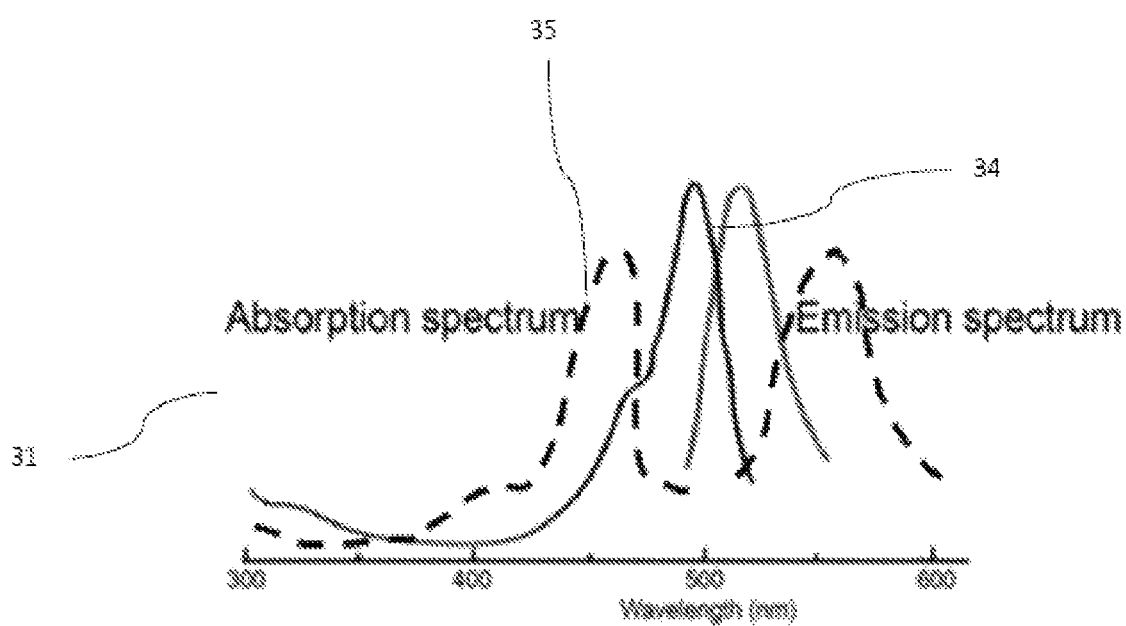
FIG. 20 is a diagram consisting of a graph of the fluorescence spectra of authentic and counterfeit 3D-printed objects, according to an embodiment of the disclosure.

FIG. 20 is a diagram consisting of a graph 31 of the fluorescence spectra of authentic 34 and counterfeit 35 3D-printed objects.

Figure 21:
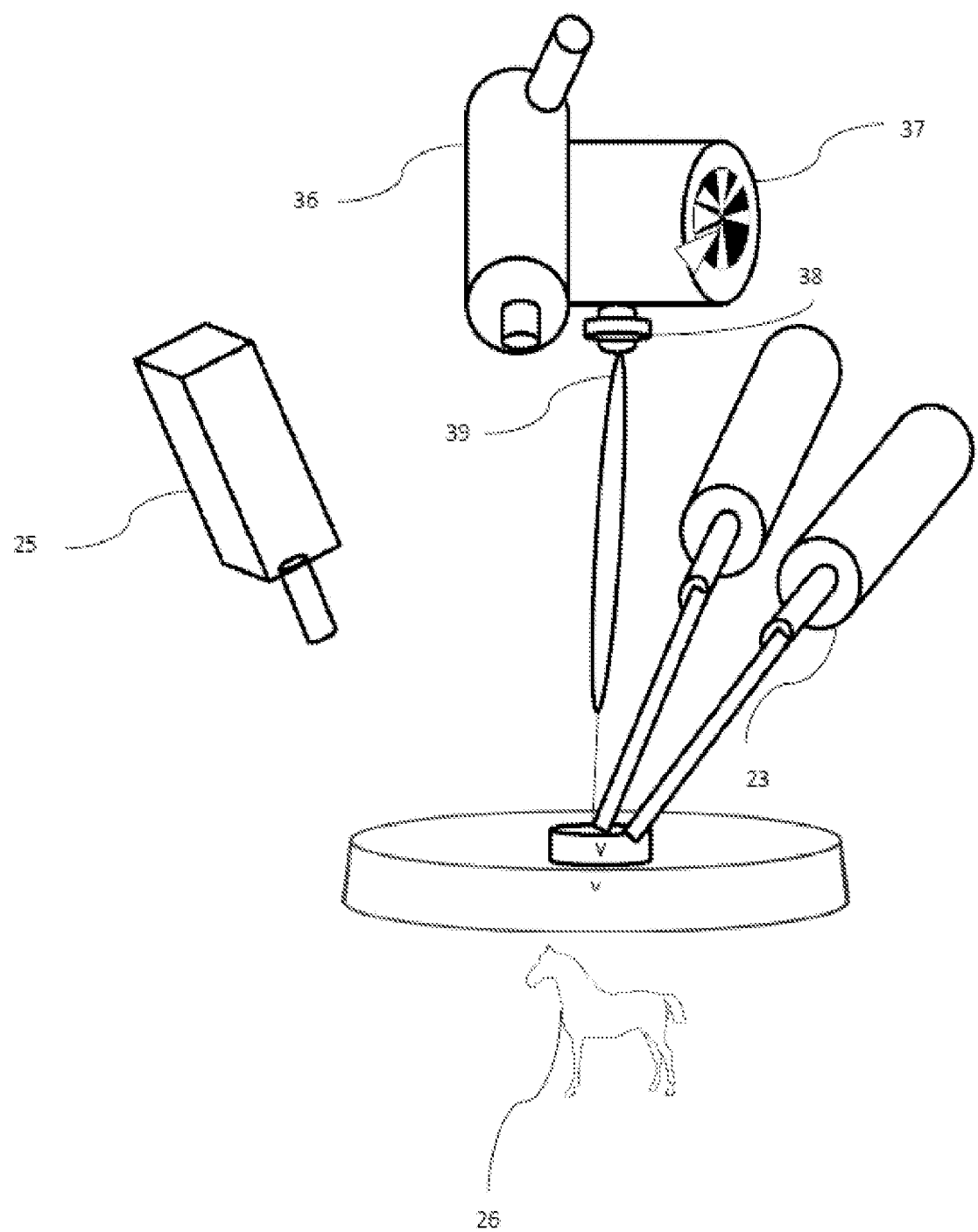
FIG. 21 is a diagram illustrating authentication of a 3D-printed object using x-ray fluorescence spectroscopy (XRF), according to an embodiment of the disclosure.

FIG. 21 is a diagram illustrating authentication of a 3D-printed object 26 using x-ray fluorescence spectroscopy (XRF). XRF occurs when electrons are displaced from their atomic orbital positions, releasing a burst of energy that is characteristic of a specific element. Detection is performed by a detector 25 on the 3D printed object 26. An x-ray fluorescence image processor consisting of a microscope and CCD camera 36, an x-ray tube 37, an x-ray filter 38 and a capillary lens 39 is used to capture and process the resulting image. Detection occurs when the energy from the source 23, interacting with a 3D-printed object 26, results in an x-ray fluorescence spectrum.

Figure 22:
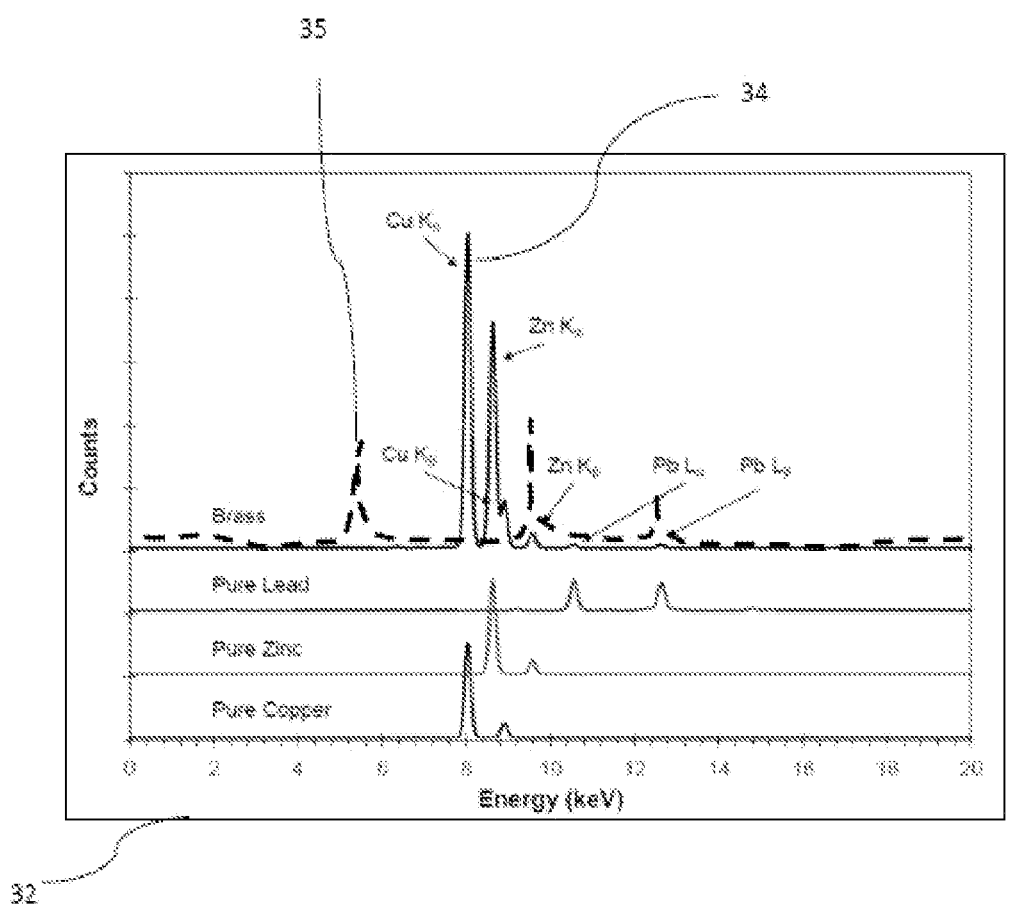
FIG. 22 is a diagram consisting of a graph of the x-ray fluorescence spectra of authentic and counterfeit 3D-printed objects, according to an embodiment of the disclosure.

FIG. 22 is a diagram consisting of a graph 32 of the x-ray fluorescence spectra of authentic 34 and counterfeit 35 3D-printed objects.

Figure 23:
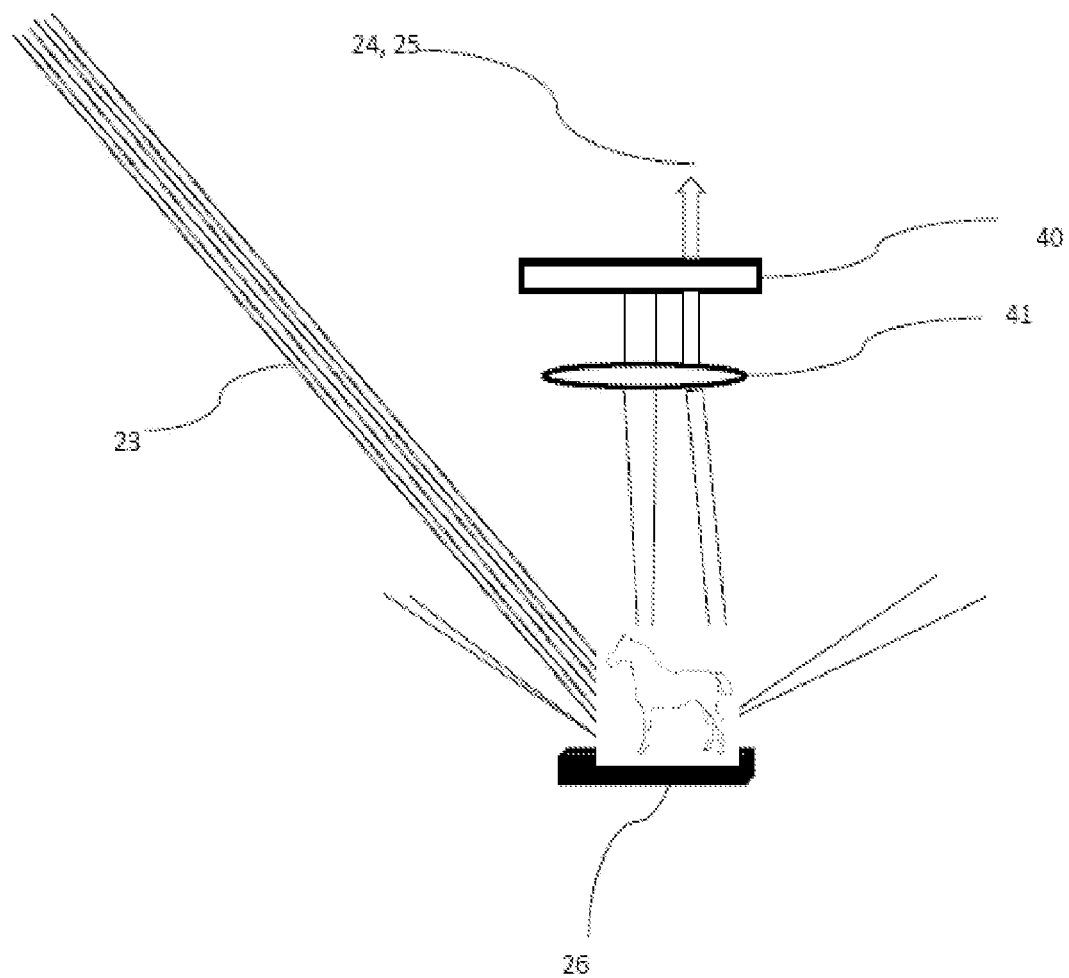
FIG. 23 is a diagram illustrating authentication of a 3D-printed object using Raman spectroscopy, according to an embodiment of the disclosure.

FIG. 23 is a diagram illustrating authentication of a 3D-printed object 26 using Raman spectroscopy. The Raman effect occurs when incident photons interact with molecules in such away that energy is either gained or lost so that the scattered photons are shifted in frequency. Such inelastic scattering is called Raman scattering. Detection by a detector 25 of the tagged 3D printed object 26 occurs when the energy from the source 23, processed through a lens 41 and filter 40, is attenuated by the monochromator 24, resulting in a Raman spectrum.

Figure 24:
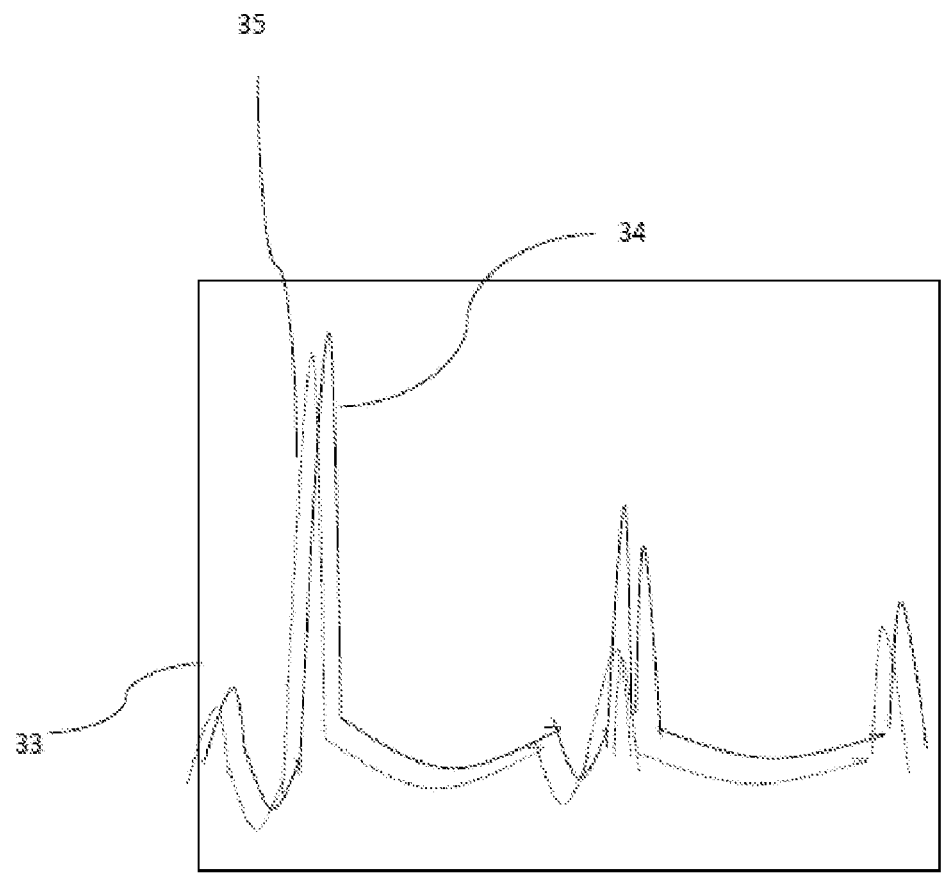
FIG. 24 is a diagram consisting of a graph of the Raman spectra of authentic and counterfeit 3D-printed objects, according to an embodiment of the disclosure.

FIG. 24 is a diagram consisting of a graph 33 of the Raman spectra of authentic 34 and counterfeit 35 3D-printed objects.

Figure 25:
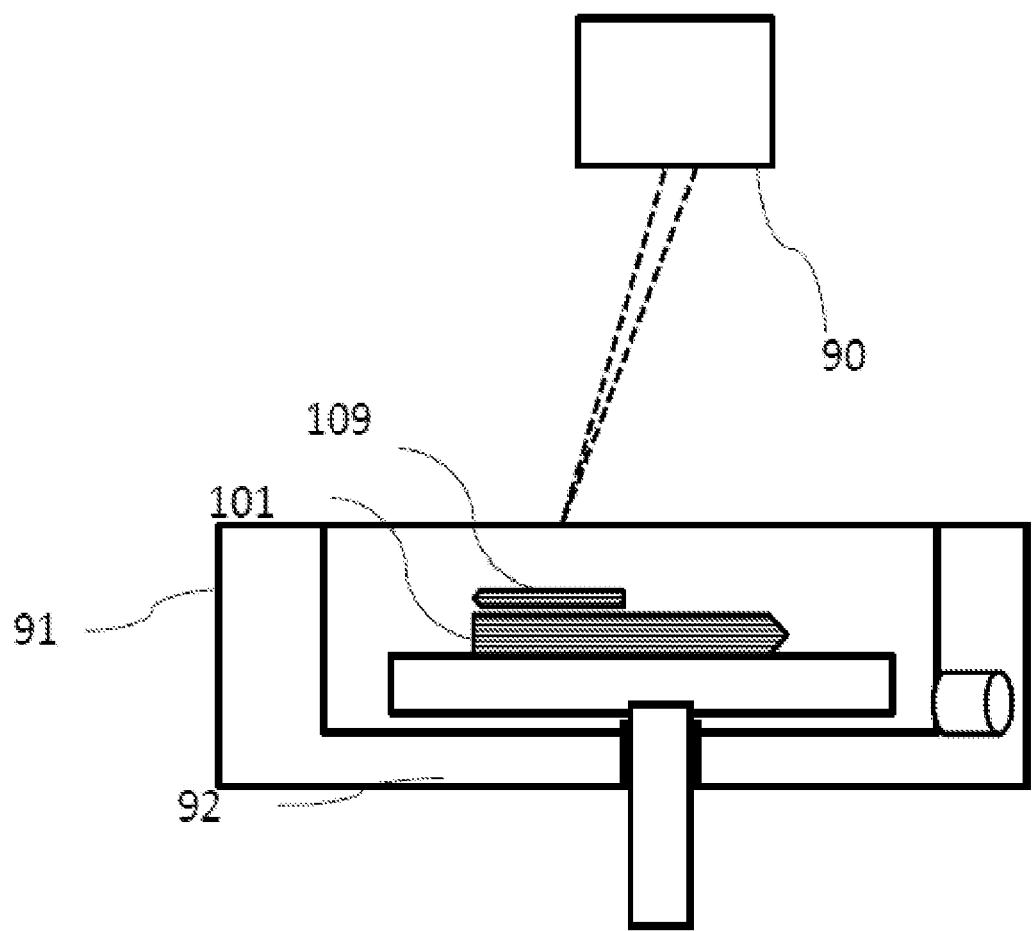
FIG. 25 is a diagram illustrating the creation of a tagged article of manufacture using a UV-cure resin 3D printer, according to an embodiment of the disclosure.

Example 1. [NIR spectroscopy] An article of manufacture was created using a UV-cure resin 3D printer, as shown in FIG. 25. Such a printer cures the workpiece by directing UV lights of various wavelengths at a moveable platform in a vat 91 of resin 92, exposing liquid polymer resin and then curing it layer by layer. The UV-curable resin was formulated using urethane acrylate added to a mix of photoinitiators in the UV longwave and shortwave range. The workpiece layers of untagged resin were cured, the untagged liquid resin was removed, and the tagged resin was placed in the tray for curing of subsequent layers 109. In this case the near-infrared-active resin was formulated as a homogeneous mix; in the case of a UV-curing 3D printer with multiple jets for resin delivery rather than a vat of liquid, taggant would be employed in one or more jets rather than as a homogeneous mix.

Figure 26:
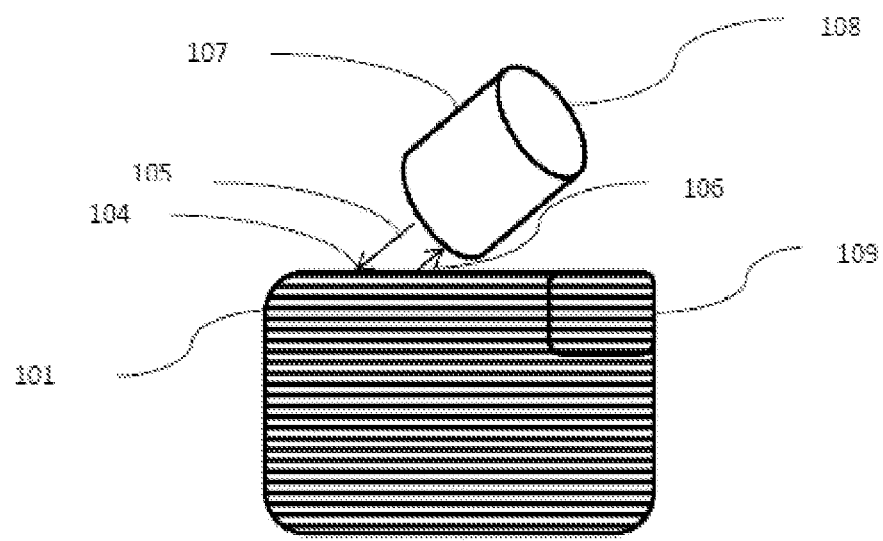
FIG. 26 is a diagram illustrating the authentication, using near-infrared spectroscopy, of a tagged article of manufacture created using a UV-cure resin 3D printer, according to an embodiment of the disclosure.

3D printing was carried out, building up a block of solid material 101 with a cross section as shown in FIG. 26. Part of the workpiece was created using a separate tray of standard, untagged UV-curing resin, placed into the vat. After the block was printed it was subjected to NIR spectroscopy.

Electromagnetic radiation emitted from polychromic radiation source 107 in the wavelength range from 320 nm to 2500 nm impinged upon the block at area 104 along path 105 toward the block, area 104 being the urethane acrylate and photoinitiator blend. Diffuse reflectance path 106 brought near-infrared radiation in the range of 800 nm to 2500 nm to indium gallium arsenide (InGaAs) detector 108, creating peaks in the target range but no single peak at 1200 nm. The spectrometer was then moved laterally (to the right in FIG. 26) so that the spectroscopic analysis was carried out at area 109. The value for near-infrared radiation in the range of 800 nm to 2500 nm contained a peak in the range of 1200 nm. In this way the presence of the tagged resin was detected and confirmed.

Example 2. [UV/Vis] An article of manufacture is created using a hot-melt-plastic 3D printer with two nozzles. One nozzle extrudes a conventional polycarbonate. The other nozzle extrudes a specially blended polyethylene terephthalate to which kaolin has been added to a concentration of about ten percent by weight. Such a printer feeds a thin flexible rod stock from a spool into the hot nozzle for extrusion to the workpiece. The conventional polycarbonate feedstock is commercially available feedstock for conventional hot-melt-plastic 3D printers.

Figure 27:
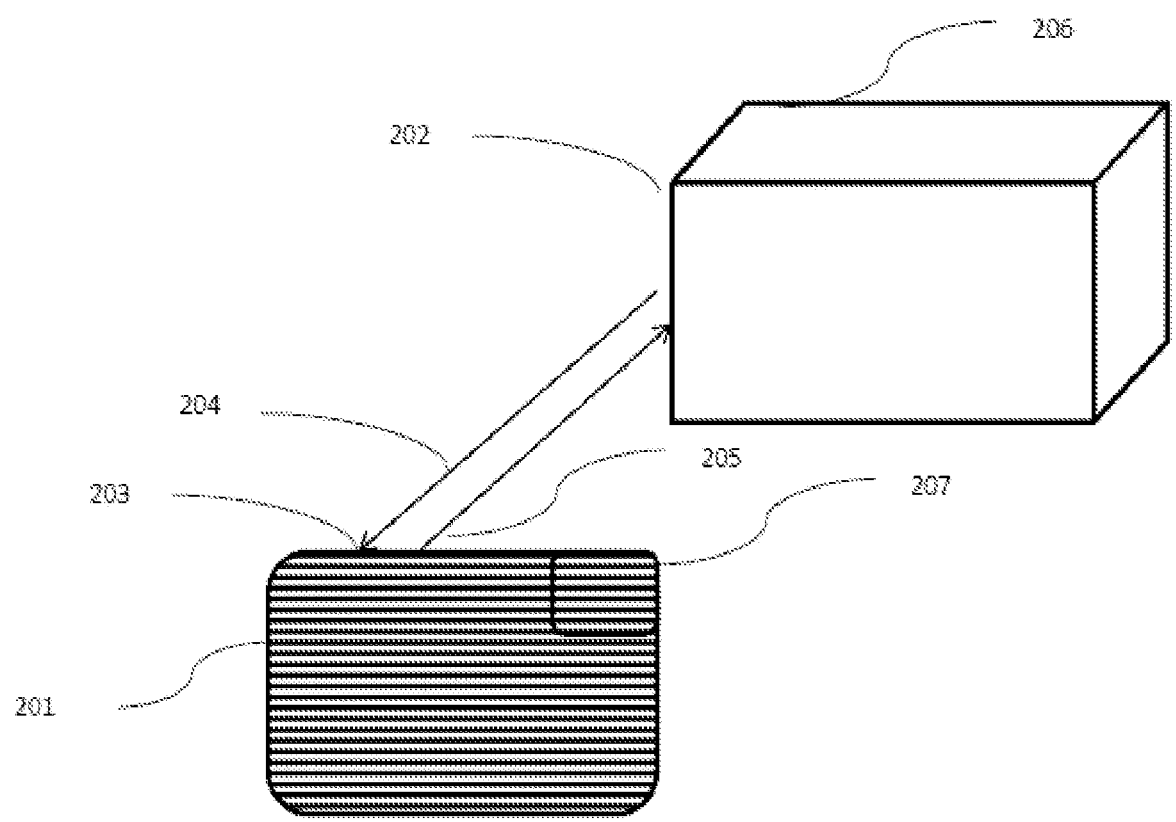
FIG. 27 is a diagram illustrating the authentication, using UV/Vis spectroscopy, of a tagged article of manufacture created using a hot-melt-plastic 3D printer, according to an embodiment of the disclosure.

3D printing is carried out, building up a block of solid material 201 with a cross section as shown in FIG. 27. Part of the workpiece is created using a separate filament of standard, untagged polycarbonate. After the block is printed it is subjected to UV/Vis spectroscopy. Electromagnetic radiation emitted from polychromic radiation source 202 in the wavelength range from 200 nm to 1100 nm impinges upon the block at area 203 along path 204 toward the block, area 203 being the polycarbonate. Attenuated total reflection path 205 brings attenuated total reflection radiation in the range of 200 nm to 1100 nm to detector 206, creating a peak at 280 nm. The spectrometer is then moved laterally (to the right in FIG. 27) so that the spectroscopic analysis is carried out at area 207. The value for UV/Vis radiation in the range of 200 nm to 1100 nm contains no peaks at 280 nm. In this way the presence of the tagged resin is detected and confirmed.

Example 3. [Fluorescence spectroscopy] An article of manufacture is created using a hot-melt-plastic 3D printer with two nozzles. One nozzle extrudes a conventional high density polyethylene. The other nozzle extrudes a specially blended Acrylonitrile butadiene styrene to which kaolin has been added to a concentration of about ten percent by weight. Such a printer feeds a thin flexible rod stock from a spool into the hot nozzle for extrusion to the workpiece. The conventional ABS feedstock is commercially available feedstock for conventional hot-melt-plastic 3D printers.

To prepare the blended ABS, commercially available ABS/kaolin composite is gravity-fed into a positive-displacement pump which forces the mixture into a hot die for extrusion into the thin flexible rod stock needed by the hot nozzles of the printer.

Figure 28:
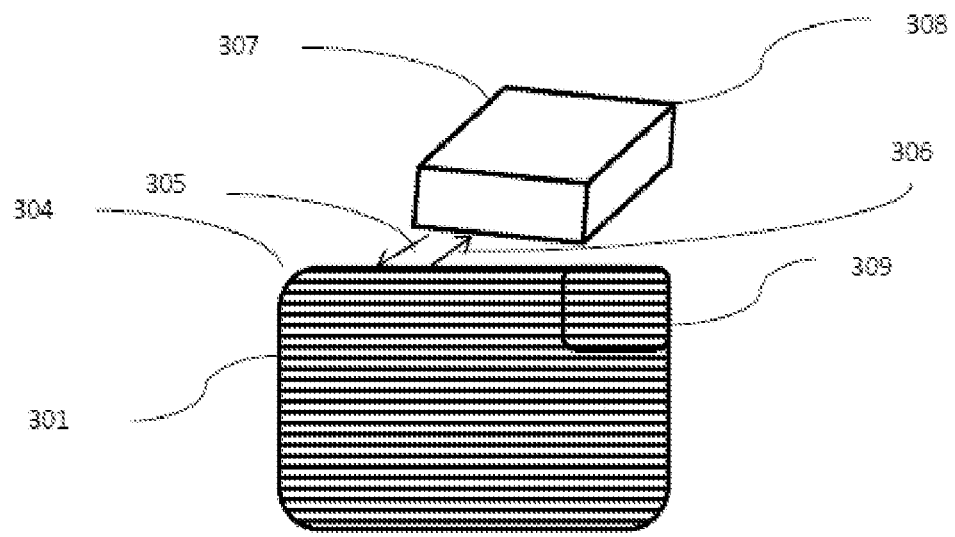
FIG. 28 is a diagram illustrating the authentication, using fluorescence spectroscopy, of a tagged article of manufacture created using a hot-melt-plastic 3D printer, according to an embodiment of the disclosure.

3D printing is carried out, building up a block of solid material 301 with a cross section as shown in FIG. 28. Part of the workpiece is created using a separate filament of standard, untagged high density polyethylene. After the block is printed it is subjected to fluorescence spectroscopy. Electromagnetic radiation emitted from polychromic radiation source 302 in the wavelength range from 200 nm to 1100 nm is attenuated resulting in radiation at an excitation wavelength then impinged upon the block at area 303 along path 304 toward the block, area 303 being the high density polyethylene. Fluorescence path 305 brings fluorescence radiation in the range of 200 nm to 1100 nm to detector 306, creating radiation at an emission but not at the wavelength of 600 nm. The spectrometer is then moved laterally (to the right in FIG. 28) so that the spectroscopic analysis is carried out at area 307. Electromagnetic radiation emitted in the range of 200 nm to 1100 nm contains a peak at 600 nm. In this way the presence of the tagged resin is detected and confirmed.

Example 4. [xRF spectroscopy] An article of manufacture is created using a 3D metal powder printer. A first layer of stainless steel powder is placed in a build box, a print head deposits binder for each layer, a roller applies a new layer of steel powder, the print head deposits a new layer of binder, and so on. The object is sintered in a curing oven. In the second stage, the cured model is infused with bronze powder, and then heated so that the bronze is infiltrated into the steel. A third material, cobalt, is infused into a section to serve as a taggant.

Figure 29:
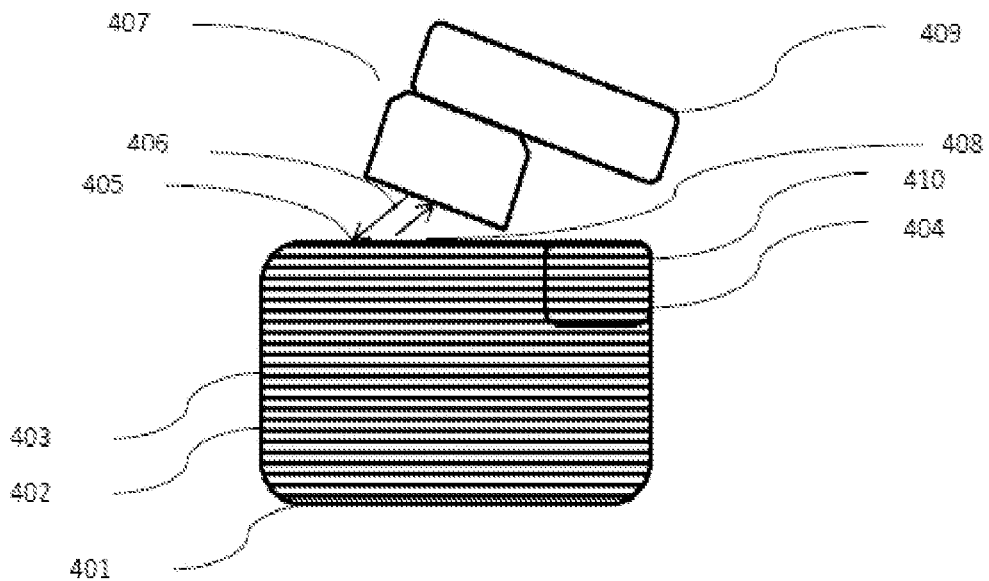
FIG. 29 is a diagram illustrating the authentication, using x-ray fluorescence spectroscopy, of a tagged article of manufacture created using a 3D metal powder printer, according to an embodiment of the disclosure.

The 3D printing process builds up a block of solid material 401 with a cross section as shown in FIG. 29. As may be seen in FIG. 29, most of the body of material 402 is stainless steel and 403 bronze. A portion of the material 404 is cobalt. After the block is printed it is allowed to cool and is then subjected to x-ray fluorescence spectroscopy.

Electromagnetic radiation emitted from x-ray radiation source 407 impinges upon the block at area 405 along path 406 toward the block, area 405 being the stainless steel infiltrated with bronze.

In response to x-ray radiation directed along path 406 at the resulting 3D-printed object, electrons are displaced from their atomic orbital positions, releasing a burst of energy in the form of an x-ray along path 408 to x-ray fluorescence detector 409.

The spectrometer is then moved laterally (to the right in FIG. 29) so that the spectroscopic analysis is carried out at area 410, releasing a burst of energy in the form of an x-ray that is characteristic of the taggant element at 6.93 keV, in this way detecting and confirming the presence of the cobalt taggant.

Example 5. [Raman spectroscopy] An article of manufacture is created using a hot-melt-plastic 3D printer with two nozzles. One nozzle extrudes a conventional ABS (Acrylonitrile butadiene styrene). The other nozzle extrudes a specially blended ABS to which kaolin has been added to a concentration of about ten percent by weight. Such a printer feeds a thin flexible rod stock from a spool into the hot nozzle for extrusion to the workpiece. The conventional ABS feedstock is commercially available feedstock for conventional hot-melt-plastic 3D printers.

To prepare the blended ABS, commercially available ABS/kaolin composite is gravity-fed into a positive-displacement pump which forces the mixture into a hot die for extrusion into the thin flexible rod stock needed by the hot nozzles of the printer.

Figure 30:
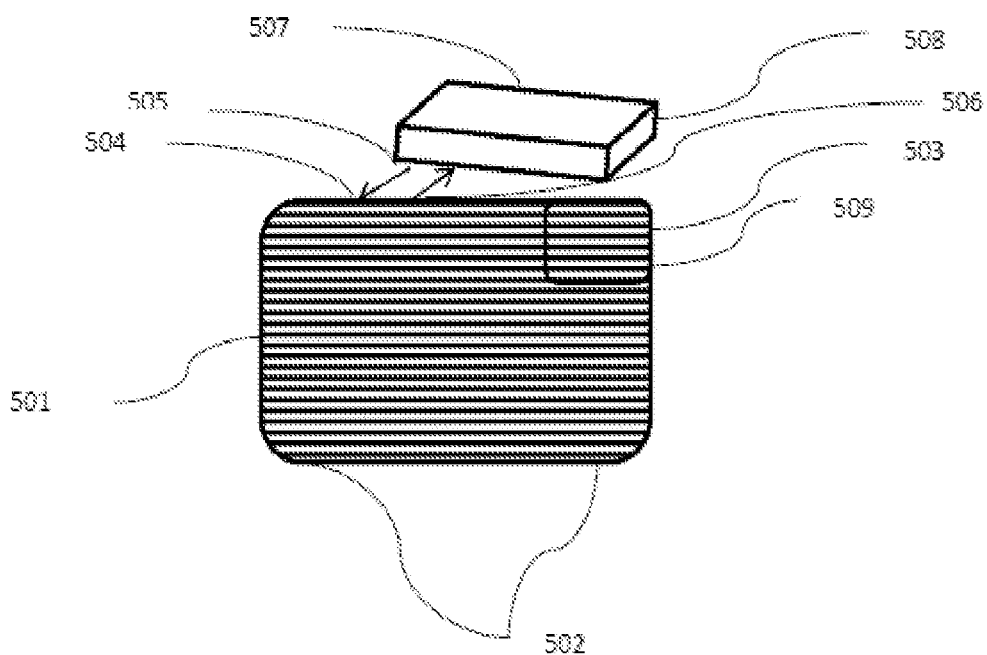
FIG. 30 is a diagram illustrating the authentication, using Raman spectroscopy, of a tagged article of manufacture created using a hot-melt-plastic 3D printer, according to an embodiment of the disclosure.

3D printing is carried out, building up a block of solid material 501 with a cross section as shown in FIG. 30. As may be seen in FIG. 30, most of the body of material 502 is the conventional ABS. A portion of the material 503 is the blended ABS containing kaolin. After the block is printed it is allowed to cool and is then subjected to Raman spectroscopy. Electromagnetic radiation emitted from laser radiation source 507 in the wavelength range from 320 nm to 3000 nm impinges upon the block at area 504 along path 505 toward the block, area 504 being the conventional ABS. Diffuse reflectance path 506 brings near-infrared-midinfrared radiation in the range of 800 nm to 3000 nm to Raman detector 508, creating a spectrum but no peak in the range of 2706 nm. The spectrometer is then moved laterally (to the right in FIG. 30) so that the spectroscopic analysis is carried out at area 509. The value for near-infrared-midinfrared radiation in the range of 800 nm to 3000 nm contains a peak in the range of 2706 nm. In this way the presence of the ABS composite is detected and confirmed.

Exemplary Applications and Uses

Any production process using additive printing can employ the invention described herein. The objects produced may be entire standalone objects, or they may be parts, including replacement parts, that can be "authorized" using this method for creating authenticable versions.

The use of 3D scanners, with easy copying that can create an identical object in a minutes-long scan-to-copy process raises a key question: what is an original? There is a fast-emerging need for techniques to mark a branded, authentic, authorized version. The invention described here creates that authorized version in a chemical, official recipe, in a way that can be authenticated by a handheld device (spectrometer or similar).

Tagged versions may be created using "selective deposition" with different delivery devices for different media (as is currently done with food, e.g. pesto, cheese). They may use "selective binding" on a bed of powder; a laser then moves around to link or cure materials.

The printing method may include "support material" e.g. a bicycle hinge, that gets washed away. This is supported using different solubilities.

Print materials are already available in infinite blends, e.g. from the Cornell Creative Machines Lab, and, using this invention, those blends can be manipulated in authorized ways to create spectral signatures for authentication.

Medical uses include custom-printed medical devices or drugs. Non-therapeutic ingestible objects that could be printed in authorized versions include Motorola's ingestible password pill and the like.

The use of this invention is not limited to 3D printers, but could instead be employed on an inkjet printer (U.S. Application 20130342592) configured to print on a three-dimensional object.

From 3D Scan to Model

Before printing a 3D model, customarily encoded as a standard tessellation language (STL) file, it must first be processed by a piece of software called a "slicer," which converts the model into a series of thin layers and produces a file in a particular format known as a G-code file, which contains instructions tailored to a specific printer. Several open source slicer programs exist, including Skeinforge, Slic3r, KISSlicer, and Cura.

The 3D printer follows the G-code instructions to lay down successive layers of liquid, powder, paper or sheet material to build the model from a series of cross sections. These layers, which correspond to the virtual cross sections from the CAD model, are joined or automatically fused to create the final shape. The primary advantage of this technique is its ability to create almost any shape or geometric feature.

Materials currently are compatible only with certain 3D printing methods (e.g. UV cure uses thermoplastic resins), but it is possible that future AM will allow multiple methods and more mixes of materials. Some materials currently useful for 3D printing, and therefore available as taggants or markers in this invention, include but are not limited to:

Thermoplastics such as acrylonitrile butadiene styrene (ABS), polycarbonate (PC), polylactic acid (PLA), high density polyethylene (H DPE), carbon-infused ABS, PC/ABS, nylon, polyethylene terephthalate (PET), polyphenylsulfone (PPSU) and high impact polystyrene (HIPS), HDPE; thermoplastic elastomers, thermoplastic urethanes; granular materials such as PA, PA-GF, Rigid GF, PEEK, PS, Alumide, Carbonmide; eutectic metals, edible materials such as icing, dough or chocolate, Rubber (Sugru), Modeling clay, Plasticine, RTV silicone, Porcelain, Metal clay (including Precious Metal Clay), ceramics, metal alloys, cermet, metal matrix composite, ceramic matrix composite, cobalt chrome alloys, stainless steel, aluminum, PLA mixed with wood fiber, brick mix, sand, glass, concrete, electrical ink, bio-materials, carbon fiber, wax, plaster, paper, metal foil, plastic film, pelletized materials, photopolymers.

All are compatible with at least one of the spectroscopic authentication techniques described herein.

In the case of extruded thermoplastic filament, anti-counterfeiting taggant could be added to the object using a syringe injector as part of the extruder, or simply as a defined pattern of extruded filament materials in particular layer(s) and position(s) on the 3D-printed object.

It is also possible to ensure authenticity (of the recipe, material, or both) by manipulating the curing lights, as described herein. In photo-polymerization, a vat of liquid polymer is exposed to controlled lighting under safelight conditions. The exposed liquid polymer hardens. The build plate then moves down in small increments and the liquid polymer is again exposed to light. The process repeats until the model has been built. The liquid polymer is then drained from the vat, leaving the solid model. The EnvisionTEC Perfactoryis an example of a DLP rapid prototyping system. In this case, the simplest anti-counterfeiting tagging method is to mix a spectrally-detectable taggant into one of the liquid polymers.

Inkjet printer systems like the Objet PolyJet system spray photopolymer materials onto a build tray in ultra-thin layers (between 16 and 30 µm) until the part is completed. Each photopolymer layer is cured with UV light after it is jetted, producing fully cured models that can be handled and used immediately, without post-curing. The gel-like support material, which is designed to support complicated geometries, is removed by hand and water jetting. It is also suitable for elastomers.

The Objet 1000 can deliver 120 different materials, any of which can be manipulated to serve as layered under-the-skin anti-counterfeiting taggants on part or all of the 3D-printed object.

The taggant in the spray photopolymer case could be simply one or more of the print materials, in a particular layer or layers in a particular location or locations on the printed object.

Ultra-small features can be made with the 3D microfabrication technique used in multiphoton photopolymerization. This approach uses a focused laser to trace the desired 3D object into a block of gel. Due to the nonlinear nature of photo excitation, the gel is cured to a solid only in the places where the laser was focused while the remaining gel is then washed away. Feature sizes of under 100 nm are easily produced, as well as complex structures with moving and interlocked parts. In this case, the simplest anti-counterfeiting tagging method is to mix a spectrally-detectable taggant into one of the gels.

In the case of powder-based printing, an emerging technique is to print using glue layers that link the powder into a solid 3D-printed object. Spectrally-detectable taggants can be included as a glue component in one embodiment.

Yet another approach uses synthetic resins that are solidified (e.g. UV cured) using light-emitting diodes at selected wavelengths (LEDs).

For Mask-image-projection-based stereolithography, a 3D digital model is sliced by a set of horizontal planes. Each slice is converted into a two-dimensional mask image. The mask image is then projected onto a photocurable liquid resin surface and light is projected onto the resin to cure it in the shape of the layer. The technique has been used to create objects composed of multiple materials that cure at different rates, which provide an opportunity to incorporate the authentication option described herein. In research systems, the light is projected from below, allowing the resin to be quickly spread into uniform thin layers, reducing production time from hours to minutes. Commercially available devices such as Objet Connex apply the resin via small nozzles.

Finishing

Though the printer-produced resolution is sufficient for many applications, printing a slightly oversized version of the desired object in standard resolution and then removing material with a higher-resolution subtractive process can achieve greater precision. Ensuring authenticity of the recipe can also be enforced during the subtractive finishing process.

In the office paper and cutting process used by Mcor Technologies Ltd, a tungsten carbide blade cuts the shape, and selective deposition of adhesive and pressure bonds the prototype. Here, too, authenticity can be assured as part of the finishing process, e.g. through management of the adhesive.

Food and Medicine

Cornell Creative Machines Lab has produced customized food with 3D Hydrocolloid Printing. Professor Leroy Cronin of Glasgow University proposed, in a TED Talk, that it should one day be possible to use chemical inks to print medicine. In both cases it will be extremely important to ensure that the ingredients are real, and in the case of medicine, mixed correctly. Medicine depends not only on an active pharmaceutical ingredient (API), but on the correct delivery of that API, generally as dissolved in the small intestine. Layering and particle size affect dissolution (and therefore dosing), and can be monitored using spectroscopy. In this case the invention protects not only from ingredient failures but also from potentially dangerous mix mistakes.

Mass Customization

The invention can require certain features to be authenticated while others may be permitted to vary, for local customization options. For example, a user could print an authorized version of a Mickey Mouse hat, with authentication features as in the invention, but with variable size to fit different heads.

We claim:

1. A method for providing a specially marked article of manufacture created via additive manufacturing, using one or more taggants deposited in layers as the article is being printed using a 3D printer, the article capable of being analyzed in the field with a chemical analysis device to spectroscopically determine article authenticity, the method comprising the steps of:

providing a body of first material amassed via additive manufacturing, said body of first material providing a shaped structure upon which additional layers may be put into place directly via 3D printing;

directly adhering a patch of second material via additive manufacturing onto a thickness and an area on the body of first material at a predetermined location, the second material and its predetermined location chosen to avoid interfering with the structural integrity of the article, the second material further comprising one or more taggants selected from chemicals or a combination of chemicals which are compatible with and which adhere to the first material, thereby causing said first material and said second material to form a chemical spectral pattern that can be distinguished from the spectral pattern of the first material alone or the second material alone;

ensuring the patch of second material is seamlessly incorporated into said article and visually and tactilely non-detectable to a human upon simple observation;

analyzing the article in the field with a chemical analysis device to ascertain whether the chemical spectral pattern differs from a spectral pattern of the first material; and determining if there is a difference in spectral patterns, the difference indicating the article is a genuine or authorized product; and wherein the step of ensuring the patch of second material is seamlessly incorporated into said article further comprises directly adhering a patch of third material via additive manufacturing onto the patch of second material, the patch of third material selected from chemicals or a combination of chemicals which are compatible with and which adhere to the patch of second material.

2. The method of claim 1, wherein the analyzing step further comprises observing electromagnetic stimulation of the one or more taggants via ultraviolet/visible attenuated total reflectance spectroscopy, near-infrared diffuse reflectance spectroscopy, fluorescence excitation/emission measurement, x-ray fluorescence measurement, or Raman spectroscopy.

3. The method of claim 1 further comprising the step of selecting a print-compatible polymer as the taggant to permanently adhere the patch of second material to the body of first material.

4. The method of claim 1 further comprising the step of selecting a print-compatible metal as the taggant to permanently adhere the patch of second material to the body of first material.

5. The method of claim 1 further comprising the step of selecting print-compatible chemicals, metals, polymers, resins, inks or mixes thereof as the taggant to permanently adhere the patch of second material to the body of first material.

6. A method of providing a specially marked article of manufacture created via additive manufacturing, using one or more taggants deposited in layers as the article is being printed using additive manufacturing, the article capable of being analyzed in situ with a non-destructive testing device to spectroscopically determine article authenticity, the method comprising the steps of:

selecting a first material that generates a response in the form of particles or electromagnetic radiation when stimulated with a particle or force that is transformed into a distinctive electrical signal indicative of a first spectral pattern;

amassing a body comprising the first material via additive manufacturing, said body of first material providing a shaped structure upon which additional layers may be put into place directly via 3D printing;

selecting one or more taggants from chemicals or a combination of which are compatible with and which adhere to the first material, the one or more taggants configured to be a patch of second material;

directly adhering said patch of second material via additive manufacturing to the body of first material at a predetermined location, the patch of second material and its predetermined location chosen to avoid interfering with the structural integrity of the article, said first material and said second material forming a chemical spectral pattern that can be distinguished from the spectral pattern of the first material alone or the second material alone;

ensuring that the patch of second material is seamlessly incorporated into said article;

concealing the patch of second material so that it is visually and tactilely non-detectable to a human upon simple observation; and analyzing the article in situ with a non-destructive testing device to ascertain whether the chemical spectral pattern differs from the first spectral pattern, a difference in spectral patterns being an indicator that the article is a genuine or authorized product; and wherein the step of ensuring the patch of second material is seamlessly incorporated into said article further comprises selecting a third material from chemicals or a combination of chemicals for compatibility and adherence with the patch of second material.

7. The method of claim 6 further comprising the step of selecting a print-compatible polymer as the taggant to permanently adhere the patch of second material to the body of first material.

8. The method of claim 6 further comprising the step of selecting a print-compatible metal as the taggant to permanently adhere the patch of second material to the body of first material.

9. The method of 6 further comprising the step of selecting print-compatible chemicals, metals, polymers, resins, inks or mixes thereof as the taggant to permanently adhere the patch of second material to the body of first material.

10. The method of 6, wherein the analyzing step further comprises determining a first value for the first material, a second value for the second material that is non-identical to the first value, and ascertaining authenticity by observing a difference in the first value and a combination of the first value and the second value.

11. The method of claim 6, wherein the analyzing step further comprises observing electromagnetic stimulation of the one or more taggants via ultraviolet/visible attenuated total reflectance spectroscopy, near-infrared diffuse reflectance spectroscopy, fluorescence excitation/emission measurement, x-ray fluorescence measurement, or Raman spectroscopy.

12. The method of claim 6 further comprising directly adhering the third material onto the patch of second material via additive manufacturing.

* * * * *